(12) United States Patent
Cheong et al.

(10) Patent No.: US 12,198,732 B2
(45) Date of Patent: Jan. 14, 2025

(54) ELECTRONIC DEVICE FOR PROCESSING AUDIO DATA AND METHOD FOR OPERATING SAME

(71) Applicant: Samsung Electronics Co., Ltd., Suwon-si (KR)

(72) Inventors: Gupil Cheong, Suwon-si (KR); Hyunwook Kim, Suwon-si (KR); Hangil Moon, Suwon-si (KR); Byoungchul Lee, Suwon-si (KR); Juyeon Jin, Suwon-si (KR); Doosuk Kang, Suwon-si (KR); Bokun Choi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 300 days.

(21) Appl. No.: 17/310,460

(22) PCT Filed: Jul. 29, 2021

(86) PCT No.: PCT/KR2021/009906
§ 371 (c)(1),
(2) Date: Aug. 4, 2021

(87) PCT Pub. No.: WO2022/030882
PCT Pub. Date: Feb. 10, 2022

(65) Prior Publication Data
US 2022/0319553 A1   Oct. 6, 2022

(30) Foreign Application Priority Data

Aug. 4, 2020 (KR) .................. 10-2020-0097681

(51) Int. Cl.
*G11B 27/10* (2006.01)
(52) U.S. Cl.
CPC ................... *G11B 27/10* (2013.01)

(58) Field of Classification Search
CPC .... H04M 1/72412; H04M 1/02; H04M 1/725; G06F 3/16; G11B 27/10; G11B 27/031; H04W 4/80
(Continued)

(56) References Cited

U.S. PATENT DOCUMENTS 8,922,713 B1* 12/2014 Chakrovorthy .......... H04N 5/04
  348/515
9,787,862 B1* 10/2017 Newman ............... G11B 27/031
10,419,853 B2   9/2019 Hariharan et al.
(Continued)

FOREIGN PATENT DOCUMENTS

CN   101278596 A   10/2008
CN   108702559 A   10/2018
(Continued)

OTHER PUBLICATIONS

International Search Report and Written Opinion of the International Searching Authority in connection with International Application No. PCT/KR2021/009906 issued Nov. 4, 2021, 9 pages.
(Continued)

*Primary Examiner* — Thai Q Tran
*Assistant Examiner* — Nienru Yang

(57) ABSTRACT

An electronic device according to various embodiments includes a camera; a display; a communication module supporting Bluetooth communication; and a processor configured to: establish a communication link with a plurality of external electronic devices through the communication module; transmit a first signal indicating an occurrence of an event using the camera to at least one of the plurality of external electronic devices through the communication link; receive audio data corresponding to sound acquired by each of the plurality of external electronic devices, from each of the plurality of external electronic devices in predetermined time periods through the communication link in a state in
(Continued)

which the plurality of external electronic devices are worn; and synchronize the audio data with video acquired using the camera and store the synchronized data, based on time and an order at which each of the plurality of external electronic devices acquires the sound.

10 Claims, 18 Drawing Sheets

(58) Field of Classification Search
USPC .......................................................... 386/201
See application file for complete search history.

(56) References Cited

U.S. PATENT DOCUMENTS

| | | | |
|---|---|---|---|
| 2012/0058727 | A1 | 3/2012 | Cook et al. |
| 2015/0364143 | A1 | 12/2015 | Abildgren et al. |
| 2016/0001193 | A1* | 1/2016 | Eck .................. A63J 7/005 446/26 |
| 2016/0357510 | A1* | 12/2016 | Watson ................ G06F 3/162 |
| 2017/0150266 | A1 | 5/2017 | Mattana |
| 2017/0192743 | A1 | 7/2017 | Chun et al. |
| 2017/0264792 | A1 | 9/2017 | Lee et al. |
| 2018/0084215 | A1 | 3/2018 | Jing et al. |
| 2019/0158722 | A1 | 5/2019 | Jung et al. |
| 2019/0261089 | A1* | 8/2019 | Hariharan ............... H04R 5/04 |
| 2020/0053460 | A1* | 2/2020 | Pedersen ............ H04R 25/554 |

FOREIGN PATENT DOCUMENTS

| | | | | |
|---|---|---|---|---|
| KR | 10-2005-0046296 | A | 5/2005 | |
| KR | 10-2014-0060003 | A | 5/2014 | |
| KR | 10-1467822 | B1 | 12/2014 | |
| KR | 10-2015-0142566 | A | 12/2015 | |
| KR | 10-2017-0022272 | A | 3/2017 | |
| KR | 10-2017-0106862 | A | 9/2017 | |
| KR | 101843800 | B1 * | 5/2018 | .............. G06F 3/16 |
| KR | 10-2018-0138017 | | 12/2018 | |
| KR | 10-2019-0056696 | | 5/2019 | |
| KR | 10-2019-0090069 | | 7/2019 | |
| WO | 20202102156 | A1 | 5/2020 | |

OTHER PUBLICATIONS

The First Office Action dated Oct. 19, 2023, in connection with Chinese Application No. 202180058285.2, 17 pages.
Supplementary European Search Report dated Aug. 18, 2023, in connection with European Application No. 21852943.6, 10 pages.
Notification of the Second Office Action dated Mar. 8, 2024, in connection with Chinese Application No. 202180058285.2, 16 pages.
Notification to Grant Patent Right for Invention dated May 30, 2024, in connection with Chinese Application No. 202180058285.2, 8 pages.

* cited by examiner

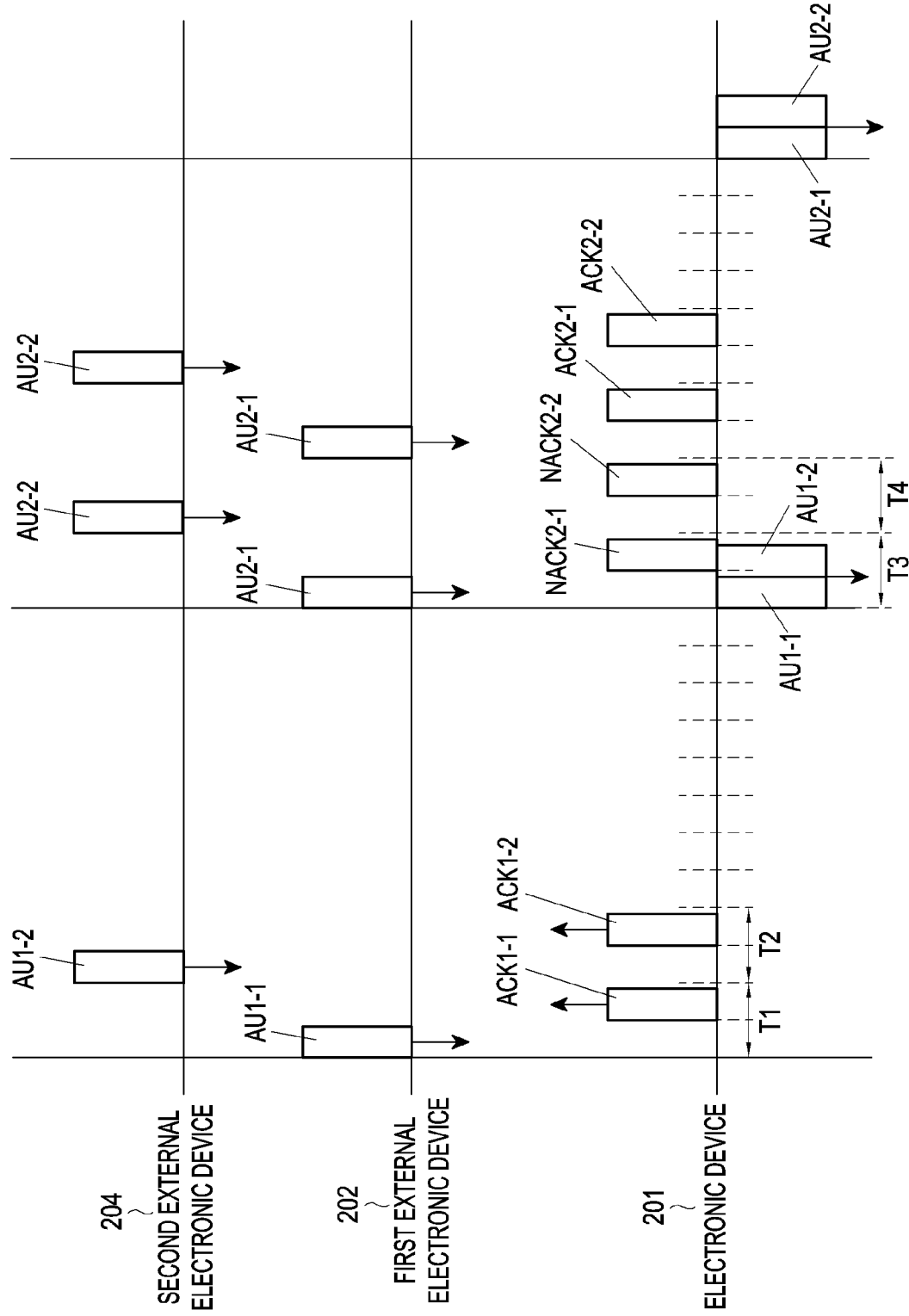

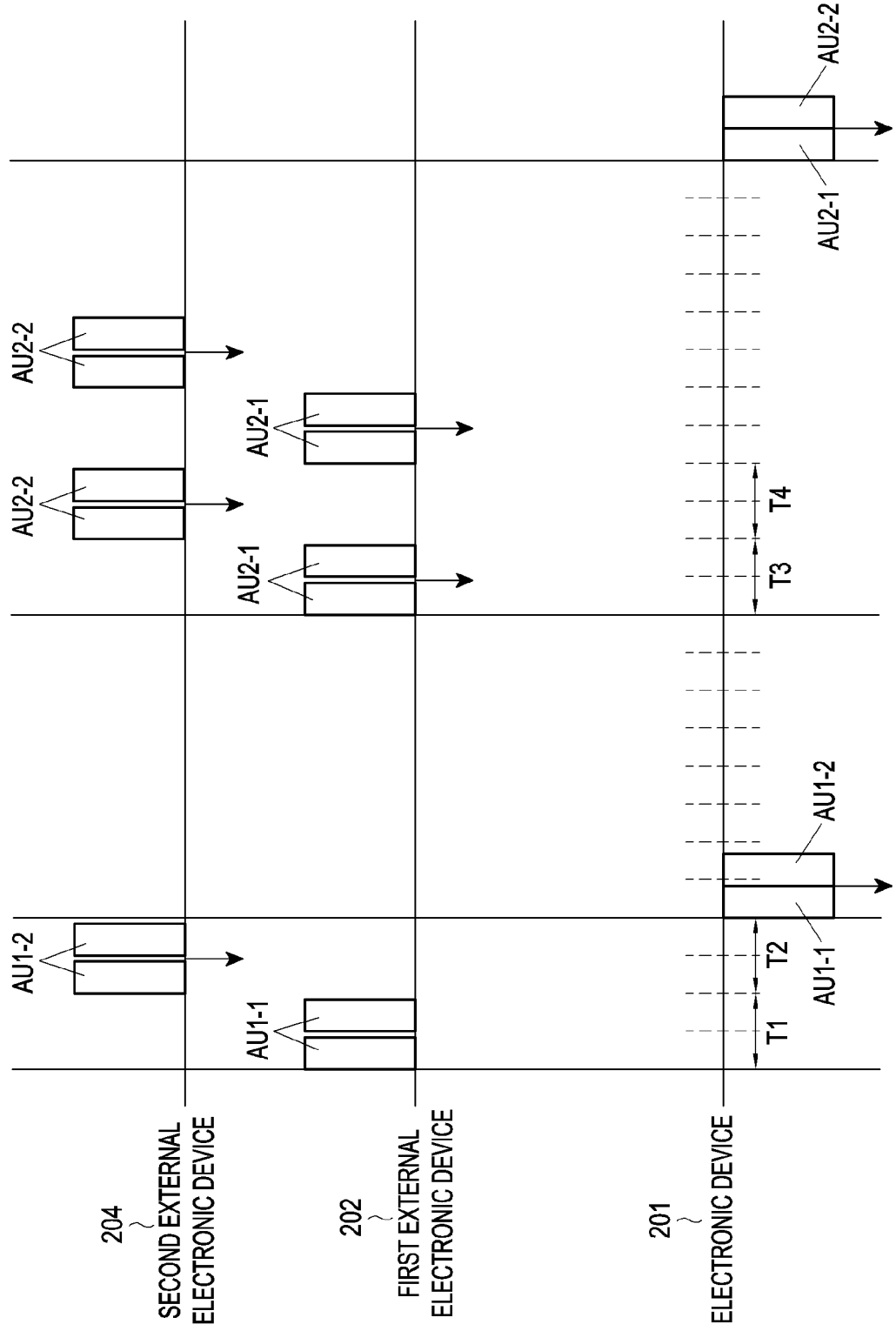

ELECTRONIC DEVICE FOR PROCESSING AUDIO DATA AND METHOD FOR OPERATING SAME

CROSS-REFERENCE TO RELATED APPLICATIONS

This application is a National Phase Entry of PCT International Application No. PCT/KR2021/009906, which was filed on Jul. 29, 2021, and claims priority to Korean Patent Application No. 10-2020-0097681 which was filed on Aug. 4, 2021 in the Korean Intellectual Property Office, the contents of which are incorporated herein by reference.

BACKGROUND

1. Field

Various embodiments relate to an electronic device for processing audio data and a method for operating the same.

2. Description of the Related Art

In line with development of wireless communication technologies, an electronic device can communicate with another electronic device through various wireless communication technologies. Bluetooth communication technology refers to a short-range wireless communication technology that enables electronic devices to connect with each other and to exchange data or information. In addition, the Bluetooth communication technology may include a legacy (or classic) network technology or a Bluetooth low energy (BLE) network, and may have a topology in various connection types, such as a piconet or a scatternet. By using the Bluetooth communication technology, electronic devices can share data with each other by consuming a small amount of power. Such Bluetooth technology may be used to connect external wireless communication devices and to transmit audio data regarding contents executed by an electronic device to an external wireless communication device such that the external wireless communication device can process the audio data and output the same to the user. There has recently been widespread use of wireless earphones using the Bluetooth communication technology.

SUMMARY

An electronic device (for example, a smartphone) including a camera may perform a function for capturing moving images or a video communication function. For example, when capturing a moving image with the smartphone, the user may record the ambient sound through a microphone included in the smartphone. if the user holds the smartphone by hand while capturing the moving image, a part of the microphone included in the smartphone may fail to properly record the ambient sound due to the user's hand. The sound acquired through the microphone of the smartphone may differ from the sound actually heard by the user, due to the mismatch between the position of the microphone and the position of the user's ears. That is, the sound of the moving image captured by the smartphone may not match with the sound heard by the user, thereby degrading the stereoscopic feeling of the sound or the fidelity thereof. In addition, the smartphone may fail to acquire stereo audio data regarding the ambient sound.

In this connection, the user may acquire the ambient sound by a separate microphone other than the smartphone. For example, if an external microphone is connected to the smartphone, the ambient sound may be acquired through the external microphone when capturing a moving image. However, even if the external microphone is used, the smartphone may fail to acquire stereo audio corresponding to the ambient sound. In addition, if the position of the external microphone does not match with the position of the user's ears, the audio data acquired by the smartphone may differ from the sound actually heard by the user. That is, even if a separate microphone is used, the smartphone may fail to acquire stereo audio data regarding the ambient sound.

Various embodiments may provide an electronic device and a method for operating the same, wherein, while multiple external electronic devices are worn by the user, audio data acquired by each of the multiple external electronic devices is received, and the audio data is synchronized with the video acquired through the camera of the electronic device and then stored.

An electronic device according to various embodiments may include a camera; a display; a communication module configured to support Bluetooth communication; and a processor, wherein the processor is configured to establish at least one communication link with a plurality of external electronic devices through the communication module; transmit a first signal indicating an occurrence of an event using the camera to at least one of the plurality of external electronic devices through the at least one communication link; receive audio data corresponding to sound acquired by each of the plurality of external electronic devices, from each of the plurality of external electronic devices in predetermined time periods through the at least one communication link in a state in which the plurality of external electronic devices are worn; and synchronize the audio data with video acquired using the camera and store the synchronized audio data, based on time and an order at which each of the plurality of external electronic devices acquires the sound.

A method of operating an electronic device according to various embodiments may include establishing at least one communication link with a plurality of external electronic devices; transmitting a first signal indicating an occurrence of an event using a camera included in the electronic device to at least one of the plurality of external electronic devices through the at least one communication link; receiving audio data corresponding to sound acquired by each of the plurality of external electronic devices, from each of the plurality of external electronic devices in predetermined time periods through the at least one communication link in a state in which the plurality of external electronic devices are worn; and synchronizing the audio data with video acquired using the camera and storing the synchronized audio data, based on time and an order at which each of the plurality of external electronic devices acquires the sound.

An electronic device according to various embodiments may include a sensor; at least one microphone; a communication module configured to support Bluetooth communication; and a processor, wherein the processor is configured to establish a communication link with external electronic devices through the communication module; receive a first signal indicating an occurrence of an event of acquiring video using a camera of the external electronic device from the external electronic device through the communication link; acquiring audio data corresponding to ambient sound through the at least one microphone in a state in which the electronic device is worn; and transmit the audio data to the external electronic device in a predetermined time period through the communication module.

An electronic device according to various embodiments may synchronize audio data acquired by each of multiple external electronic devices, while the multiple external electronic devices are worn, with video data such that the ambient sound of the space in which the video is captured can be processed clearly.

Before undertaking the DETAILED DESCRIPTION below, it may be advantageous to set forth definitions of certain words and phrases used throughout this patent document the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of the disclosure will be more apparent from the following detailed description taken in conjunction with the accompanying drawings, in which:

FIG. 8A is a diagram illustrating a method of receiving audio data from a plurality of external electronic devices by an electronic device according to various embodiments.

FIG. 9B is a diagram illustrating a method of receiving audio data from a plurality of external electronic devices by an electronic device according to various embodiments;

DETAILED DESCRIPTION

FIGS. 1 through 12E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
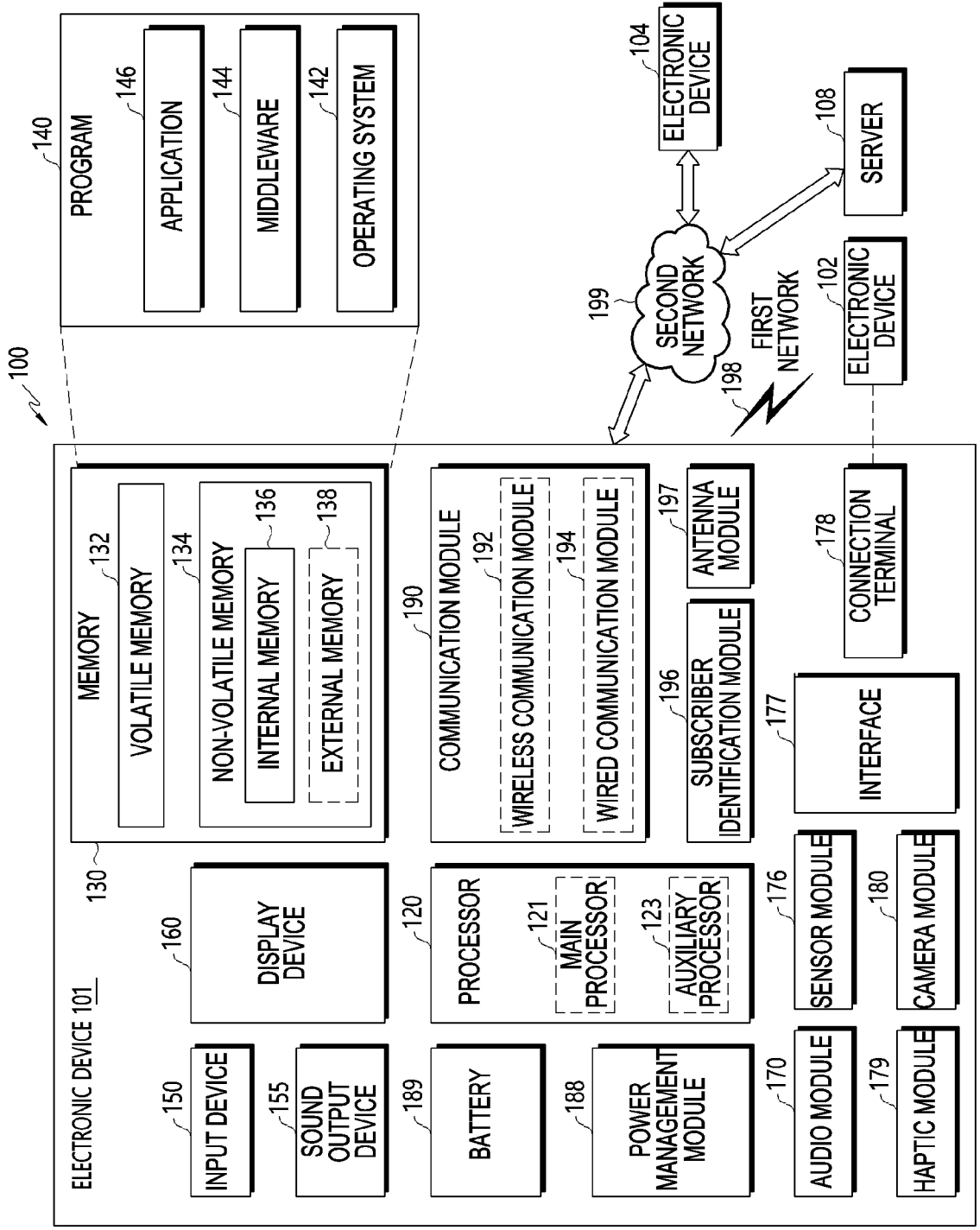
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
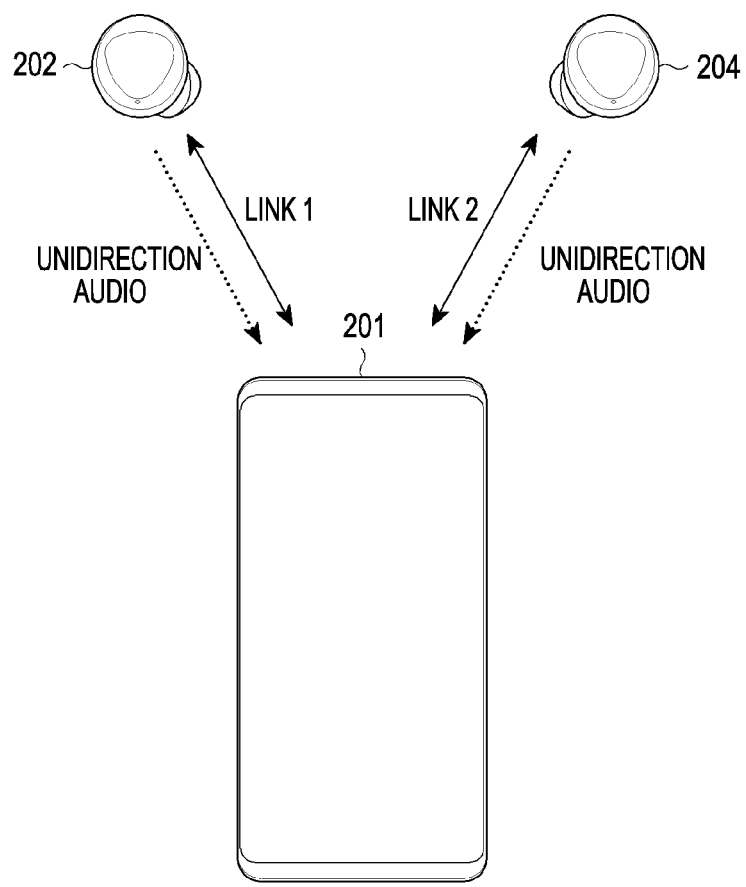
FIGS. 2A, 2B, and 2C are schematic block diagrams illustrating an electronic system according to various embodiments.
Figure 2B:
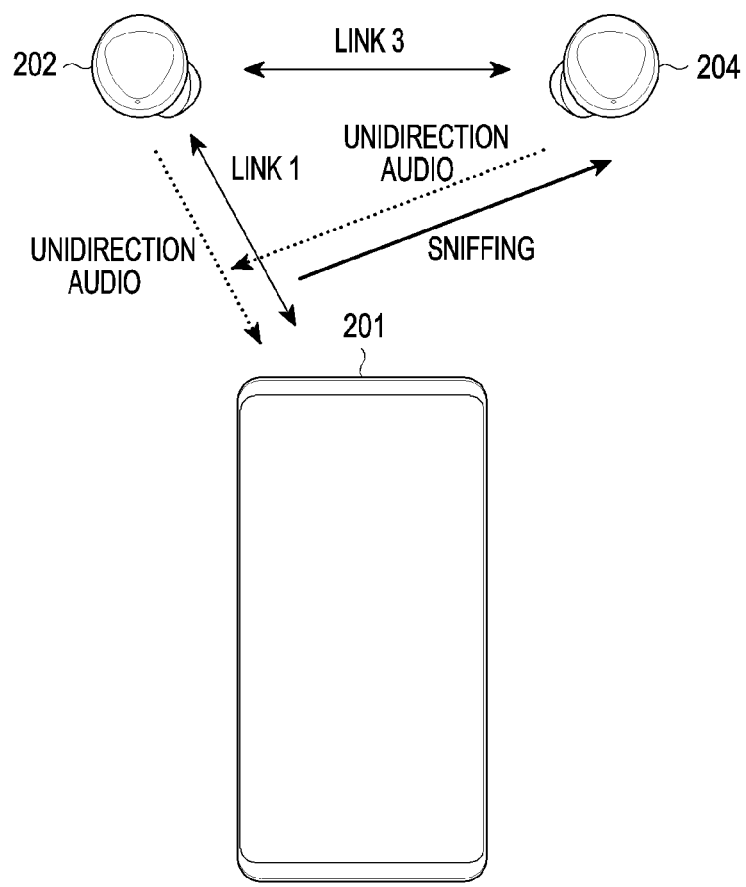
Figure 2C:
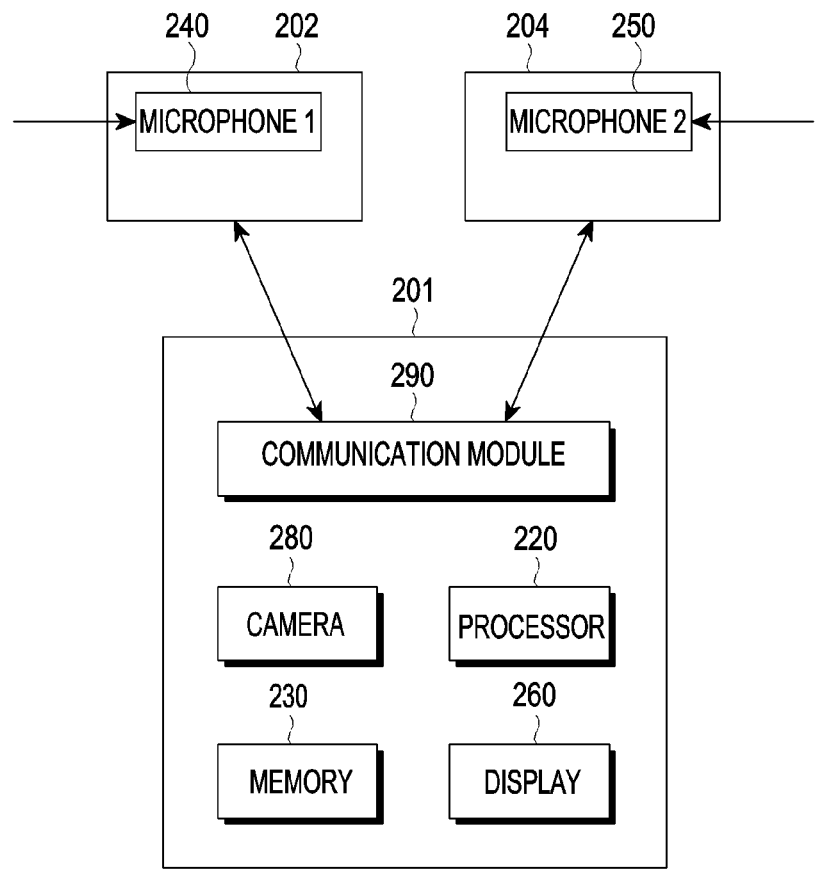

FIGS. 2A, 2B, and 2C are schematic block diagrams illustrating an electronic system according to various embodiments.

Referring to FIGS. 2A and 2B, the electronic system may include an electronic device 201 and a plurality of external electronic devices (e.g., a first external electronic device 202 and a second external electronic device 204). For example, the electronic device 201, the first external electronic device 202, and the second external electronic device 204 may be implemented in the same or similar manner as or to that in the electronic device 101 of FIG. 1. For example, the electronic device 201 may be implemented as a smartphone. The first external electronic device 202 and the second external electronic device 204 may be implemented with an earphone in a first direction (e.g., an earphone worn on the right ear) and an earphone in a second direction (e.g., an earphone worn on the left ear). According to various embodiments, the first external electronic device 202 and the second external electronic device 204 may form a pair, but may not be limited thereto.

According to various embodiments, the electronic device 201 may transmit and receive data to and from the plurality of external electronic devices 202 and 204. To this end, the electronic device 201 may establish a communication link with the plurality of external electronic devices 202 and 204 using a short-range communication method (e.g., a Bluetooth communication method or a BLE communication method). In FIGS. 2A and 2B, a method of establishing a communication link through which the electronic device 201 transmits and receives data to and from the plurality of external electronic devices 202 and 204 will be described. However, this is only an example, and the technical idea of the disclosure may not be limited thereto. For example, the electronic device 201 may establish a communication link with the plurality of external electronic devices 202 and 204 in various ways.

Referring to FIG. 2A, according to various embodiments, the electronic device 201 may establish a communication link (link 1 and link 2) with each of the plurality of external electronic devices 202 and 204. For example, the electronic device 201 may establish a communication link (link 1 and link 2) with each of the external electronic devices 202 and 204 using a truly wireless stereo (TWS) plus method, and may transmit and receive data through the communication links (link 1 and link 2). For example, the electronic device 201 may establish a first communication link (link 1) with the first external electronic device 202 and a second communication link (link 2) with the second external electronic device 204. The electronic device 201 may transmit and receive data to and from the first external electronic device 202 through the first communication link (link 1), and may transmit and receive data to and from the second external electronic device 204 through the second communication link (link 2). According to an embodiment, the electronic device 201 may manage communication resources to transmit and receive data to and from the first external electronic device 202 or the second external electronic device 204. For example, the electronic device 201 may communicate with the first external electronic device 202 or the second external electronic device 204 by dividing a frequency or time.

Referring to FIG. 2B, according to various embodiments, the electronic device 201 may transmit and receive data to and from the plurality of external electronic devices 202 and 204 through the first communication link (link 1) established by the first external electronic device 202 among the plurality of external electronic devices 202 and 204. For example, the electronic device 201 may transmit and receive data through the first communication link (link 1) established by the first external electronic device, using a sniffing method operating in a Bluetooth sniffing topology. To this end, the first external electronic device 202 may establish a third communication link (link 3) with the second external electronic device 204. The second external electronic device 204 may obtain information on the first communication link (link 1) between the first external electronic device 202 and the electronic device 201, from the first external electronic device 202 through the third communication link (link 3). According to various embodiments, the second external electronic device 204 may transmit and receive data to and from the electronic device 201 by sharing the first communication link (link 1) with the first external electronic device 202. For example, the second external electronic device 204 may directly transmit and receive data to and from the electronic device 201 by sharing the first communication link (link 1). However, this is only an example, and the second external electronic device 204 of the disclosure may transmit and receive data to and from the electronic device 201 by sharing the first communication link (link 1) according to various sniffing topologies. For example, the second external electronic device 204 may obtain information on the first communication link (link 1) from the electronic device 201. The second external electronic device 204 may obtain information on the first communication link (link 1) through a third external electronic device (not shown) (e.g., a cradle) between the first external electronic device 202 and the second external electronic device 204. The second external electronic device 204 may receive a signal broadcast by the first external electronic device 202 to obtain information on the first communication link (link 1). Alternatively, the second external electronic device 204 may receive a connection request signal sent by the electronic device 201 together with the first external electronic device 202 to obtain information on the first communication link (link 1).

According to various embodiments, the information on the first communication link (link 1) may include address information (e.g., Bluetooth address of a master device of the first communication link, Bluetooth address of the electronic device 201, and/or Bluetooth address of the first external device 201), piconet (or topology) clock information (e.g., clock native (CLKN) of the master device of the first communication link), logical transport (LT) address information (for example information allocated by the master device of the first link), used channel map information, link key information, service discovery protocol (SDP) information (e.g., service and/or profile information related to the first communication link), and/or supported feature information. The information associated with the first communication link may further include, for example, an extended inquiry response (EIR) packet. The EIR packet may include resource control information of the first communication link and/or information on a manufacturer. The second external device 204 may determine a hopping channel (or a frequency hopping channel) of the first communication link through the address information and the clock information, and may decrypt an encrypted data packet through the link key information. The second external device 204 may generate an access code (or a channel access code) and address information (e.g., LT address) corresponding to the first communication link based on the information associated with the first communication link, and may transmit a response message including the generated access code and address information to the electronic device 201.

According to various embodiments, the electronic device 201 may establish a communication link only with the first external electronic device 202. For example, the electronic device 201 may establish a communication link with one (e.g., the first external electronic device) of the external electronic devices 202 and 204 using a truly wireless stereo (TWS) method, and may transmit and receive data through the communication link. For example, the electronic device 201 may transmit and receive data to and from the first external electronic device 202 through a communication link. Also, the electronic device 201 may transmit and receive data to and from the second external electronic device 204 through the first external electronic device 202. In certain embodiments, unlike the sniffing of FIG. 2B, the second external electronic device 204 may transmit and receive data via the first external electronic device 202 in order to transmit and receive data to and from the electronic device 201.

According to the above-described method, the electronic device 201 may establish communication links with the plurality of external electronic devices 202 and 204 and may transmit and receive data. However, this is only an example, and the technical idea of the disclosure may not be limited thereto.

Referring to FIG. 2C, the electronic device 201 may include a processor 220, a memory 230, a display 260, a camera 280, and a communication module 290.

According to various embodiments, the processor 220 may control the overall operation of the electronic device 201. For example, the processor 220 may be implemented in the same or similar manner as or to that in the processor 120 of FIG. 1.

According to various embodiments, the processor 220 may acquire video (or video data) using the camera 280 (e.g., the camera module 180 of FIG. 1). For example, the processor 220 may acquire video (or video data) using the camera 280 in order to shoot a video or perform a video call. For example, the processor 220 may store the video acquired through the camera 280 in the memory 230 (e.g., the memory 130 of FIG. 1).

According to various embodiments, the processor 220 may acquire audio (or audio data) through a microphone in order to shoot a video or perform a video call. According to an embodiment, the processor 220 may acquire audio data through the external electronic devices 202 and 204. For example, the processor 220 may receive first audio data from the first external electronic device 202 and second audio data from the second external electronic device 204 through the communication module 290. For example, the first audio data may be audio data corresponding to sound acquired by the first external electronic device 202 through a first microphone 240. Also, the second audio data may be audio data corresponding to sound acquired by the second external electronic device 204 through a second microphone 250.

Meanwhile, in FIG. 2C, each of the first external electronic device 202 and the second external electronic device 204 is shown to include one microphone, but this is only for convenience of description, and the number of microphones may not be limited thereto. Each of the first external electronic device 202 and the second external electronic device 204 may include a plurality of microphones. According to an embodiment, each of the first external electronic device 202 and the second external electronic device 204 may selectively transmit audio data received through a plurality of microphones to the electronic device 101.

According to various embodiments, the processor 220 may establish at least one communication link with the plurality of external electronic devices 202 and 204 through the communication module 290 (e.g., the communication module 190 of FIG. 1). The processor 220 may transmit a signal indicating the occurrence of an event for acquiring video (or video data) by using the camera 280, to at least one of the plurality of external electronic devices 202 and 204 through the at least one communication link. For example, the signal indicating the occurrence of the event may be transmitted using at least one of various communication technologies supported by the electronic device 201 (or the communication module 290). The signal indicating the occurrence of the event may be replaced with a signal requesting audio data to be transmitted to the electronic device 201, or may be included in a signal requesting audio data.

For example, an event may mean that a function using a camera, a specific function within the camera, a function related to the camera, or an application (e.g., an application related to the camera) is executed.

According to various embodiments, the processor 220 may obtain information on the wearing states of the plurality of external electronic devices 202 and 204 through the communication module 290. For example, when the wearing state is checked by a sensor included in each of the plurality of external electronic devices 202 and 204, each of the plurality of external electronic devices 202 and 204 may transmit the information on the wearing state to the electronic device 201. The processor 220 may confirm the wearing state of each of the plurality of external electronic devices 202 and 204 based on the information on the wearing state received from each of the plurality of external electronic devices 202 and 204. In addition, the processor 220 may display the information on the wearing state through the display 260 (e.g., the display module 160 of FIG. 1).

According to various embodiments, in a state in which the plurality of external electronic devices 202 and 204 are worn, the processor 220 may receive audio data corresponding to sound acquired by each of the plurality of external electronic devices 202 and 204, from each of the plurality of external electronic devices 202 and 204 according to a predetermined order in predetermined time periods through the at least one communication link. For example, the processor 220 may sequentially receive first audio data corresponding to first sound acquired by the first external electronic device 202 and second audio data corresponding to second sound acquired by the second external electronic device 204. For example, the processor may receive the first audio data in a predetermined first time period and may receive the second audio data in a predetermined second time period. For example, the second time period may be different from the first time period.

According to various embodiments, the processor 220 may synchronize the first audio data and the second audio data with the video acquired through the camera 280 based on time and an order at which each of the plurality of external electronic devices 202 and 204 acquires sound. For example, the processor 220 may acquire stereo audio data using the first audio data and the second audio data. For example, the electronic device 201 may generate stereo audio data by processing each piece of audio data received with the same time period or with the same sequence number as if each piece of audio data were audio data at the same time point. For example, the processor 220 may decode the first audio data and the second audio data through a separate audio DSP (not shown). Through this, the processor 220 may process the first audio data and the second audio data, which are mono audio, into stereo audio data. Alternatively, the processor 220 may directly process the first audio data and the second audio data into stereo audio data in an application layer.

According to various embodiments, the processor 220 may receive, from each of the plurality of external electronic devices 202 and 204, sensor information (e.g., information acquired by the sensor included in the plurality of external electronic devices 202 and 204) and/or communication quality information (e.g., information indicating communication quality between the plurality of external electronic devices 202 and 204 and the electronic device 201) as well as audio data (e.g., the first audio data and the second audio data). The processor 220 may generate stereo audio data by using the sensor information and/or the communication quality information, in addition to the first audio data and the second audio data.

According to various embodiments, the processor 220 may synchronize the stereo audio data with video. The processor 220 may store the video synchronized with the audio data in the memory 230.

According to various embodiments, as shown in FIG. 2A, the processor 220 may receive the first audio data acquired by the first external electronic device 202 through the first communication link established with the first external electronic device 202, and may receive the second audio data acquired by the second external electronic device 204 through the second communication link established with the second external electronic device 204.

According to various embodiments, as shown in FIG. 2B, the processor 220 may receive the first audio data and the second audio data from the first external electronic device 202 and the second external electronic device 204 through the first communication link established with the first external electronic device 202.

According to various embodiments, the processor 220 may receive the first audio data and the second audio data from the first external electronic device 202 through the first communication link established with the first external electronic device 202. For example, the second external electronic device 204 may transmit the second audio data to the first external electronic device 202, and the first external electronic device 202 may transmit the first audio data and the second audio data to the electronic device 201 through the first communication link.

According to various embodiments, the processor 220 may receive the first audio data and the second audio data using at least one of an extended synchronous connections (eSCO) communication channel, an asynchronous connection-less (ACL) communication channel, or a BLE communication channel.

According to various embodiments, the processor 220 may display a first status bar corresponding to the first audio data and a second status bar corresponding to the second audio data through the display 260. For example, the first status bar may indicate at least one of a reception state of the first audio data, a volume of the first audio data, and a sound quality of the first audio data. In addition, the second status bar may indicate at least one of a reception state of the second audio data, a volume of the second audio data, and a sound quality of the second audio data. In addition, the processor 220 may adjust configuration for the volume of the second audio data and/or the sound quality of the second audio data according to a user's input to the first and second status bars.

Meanwhile, at least some of the operations of the electronic device 201 described below may be performed by the processor 220. However, for convenience of description, the following operations of the electronic device 201 will be described as being performed by the electronic device 201.

Figure 3:
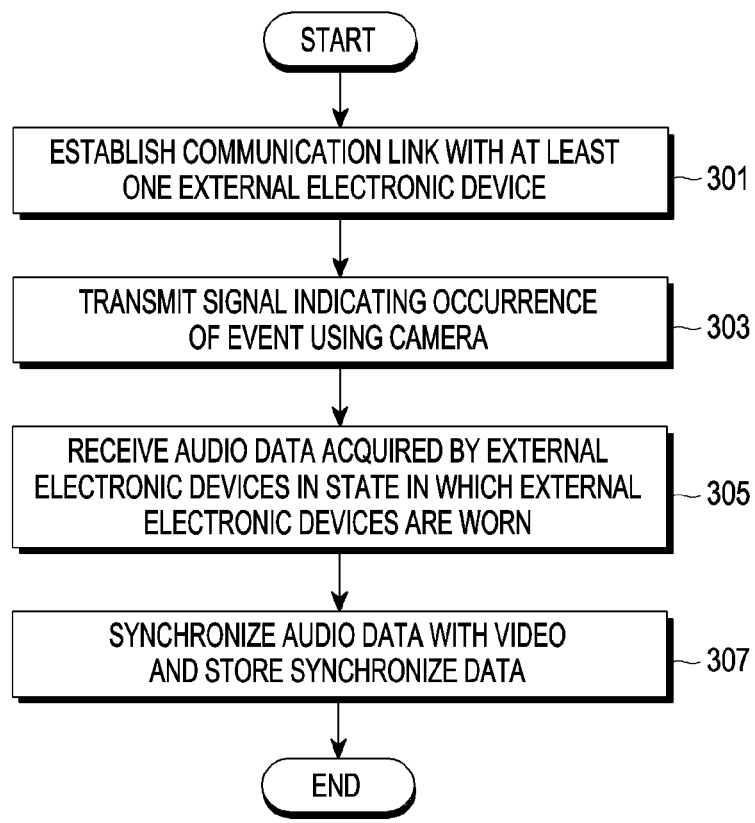
FIG. 3 is a flowchart illustrating a method of operating an electronic device, according to various embodiments.

FIG. 3 is a flowchart illustrating a method of operating an electronic device, according to various embodiments.

Referring to FIG. 3, according to various embodiments, in operation 301, an electronic device (e.g., the electronic device 201 of FIG. 2) may establish a communication link with at least one external electronic device (e.g., the external electronic devices 202 and/or 204 of FIG. 2). For example, as shown in FIG. 2A, the electronic device 201 may establish a communication link (e.g., link 1 and link 2) for each of the plurality of external electronic devices 202 and 204. Alternatively, as shown in FIG. 2B, the electronic device 201 may share the first communication link (e.g., link 1) established by the first external electronic device 202 with the second external electronic device 204.

According to various embodiments, in operation 303, when an event (e.g., an event for shooting a video) using a camera (e.g., the camera 280 of FIG. 2C) occurs, the electronic device 201 may transmit a signal indicating the occurrence of the event to the plurality of external electronic devices 202 and 204. For example, the event may mean that a function or application using a camera is executed.

Hereinafter, for convenience of description, the event is described as an event for shooting a video, but the technical idea of the disclosure may not be limited thereto. For example, the event for shooting a video may be an event related to the function of using a camera.

According to various embodiments, in operation 303, when an event for shooting a video using a camera (e.g., the camera 280 of FIG. 2C) occurs, the electronic device 201 may perform operation 301 to establish a communication link with at least one external electronic device. For example, the electronic device 201 may activate the communication module 290 based on the occurrence of the event for shooting a video using the camera, and may establish a communication link with at least one external electronic device (e.g., the first external electronic device 202 and/or the second external electronic device 204) around the electronic device 201.

According to various embodiments, in operation 305, the electronic device 201 may receive audio data acquired by the plurality of external electronic devices 202 and 204. For example, the plurality of external electronic devices 202 and 204 may acquire audio data corresponding to ambient sound in response to a signal indicating the occurrence of an event. The plurality of external electronic devices 202 and 204 may transmit the acquired audio data to the electronic device 201 through at least one communication link.

According to various embodiments, when the plurality of external electronic devices 202 and 204 receive the signal indicating the occurrence of an event for shooting a video from the electronic device 201, the wearing states of the plurality of external electronic devices 202 and 204 may be checked. For example, when the plurality of external electronic devices 202 and 204 are worn on a part of a user's body, a microphone (e.g., a first microphone 240 and a second microphone 250) may be activated to acquire audio data. Alternatively, when the plurality of external electronic devices 202 and 204 are not worn on the part of the user's body, a notification (e.g., vibration, sound, or LED display) may be provided to the user.

According to various embodiments, in a case in which the plurality of external electronic devices 202 and 204 are worn on different users, the plurality of external electronic devices 202 and 204 may process a voice signal for a voice of a user wearing the corresponding external electronic device to be distinguished when acquiring audio data by obtaining ambient sound. Through this, after synchronizing the audio data with the video data, the electronic device 201 may process to reproduce only the voice of a specific user during video playback.

According to various embodiments, in operation 307, the electronic device 201 may synchronize the audio data received from the plurality of external electronic devices 202 and 204 with video and may store the synchronized data. For example, the electronic device 201 may acquire stereo audio data by using first audio data and second audio data. Also, the electronic device 201 may synchronize the stereo audio data with video (or video data) and may output and/or store the synchronized video.

Figure 4:
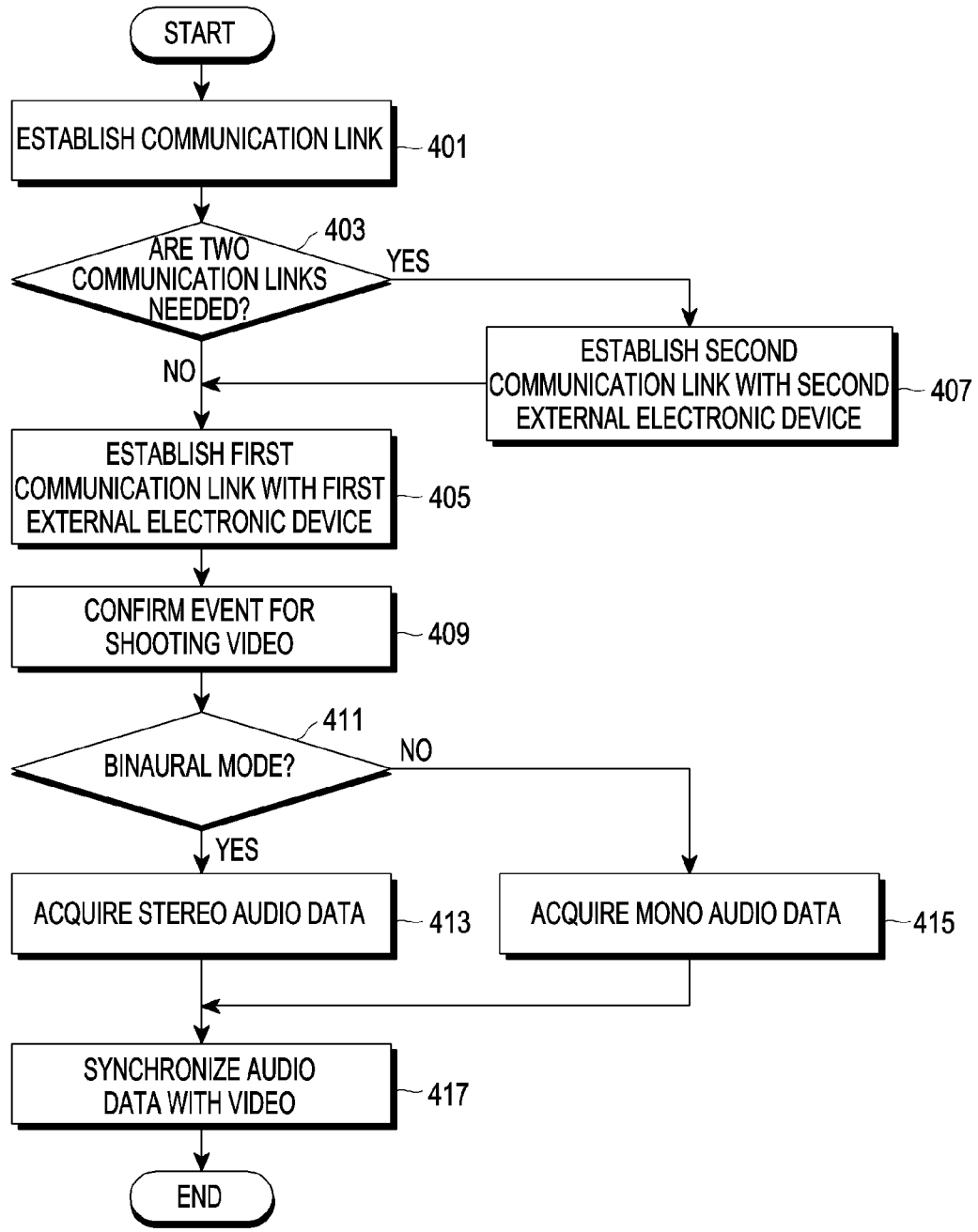
FIG. 4 is a flowchart illustrating a method of shooting a video by an electronic device using a plurality of external electronic devices according to various embodiments.

FIG. 4 is a flowchart illustrating a method of shooting a video by an electronic device using a plurality of external electronic devices, according to various embodiments.

Referring to FIG. 4, according to various embodiments, in operation 401, an electronic device (e.g., the electronic device 201 of FIG. 2) may establish a communication link with external electronic devices (e.g., the external electronic devices 202 and 204 of FIG. 2). The electronic device 201 may establish a communication link using a BLE communication technology. For example, the electronic device 201 may receive an advertisement signal from the first external electronic device 202, and may establish a first communication link with the first external electronic device 202 based on the received advertisement signal.

According to various embodiments, in operation 403, the electronic device 201 may determine or confirm whether it is necessary to establish two communication links with respect to the two external electronic devices 202 and 204. For example, the electronic device 201 may determine whether it is necessary to generate a topology between the external electronic devices 202 and 204 in a true wireless stereo plus (TWS) method or a BLE method, and may determine whether it is necessary to establish two communication links (e.g., two BT links or BLE links) according to the determination result.

According to various embodiments, when it is not necessary to establish two communication links (No in operation 403), in operation 405, the electronic device 201 may establish a first communication link with the first external electronic device 202.

According to various embodiments, when it is necessary to establish two communication links (YES in operation 403), in operation 407, the electronic device 201 may establish a second communication link with the second external electronic device 204. Next, the electronic device 201 may also establish the first communication link with the first external electronic device 202. According to an embodiment, when it is necessary to establish two communication links, the first communication link with the first external electronic device 202 may be established in operation 405, and then the second communication link with the second external electronic device 204 may be established in operation 407. For example, when a true wireless stereo (TWS) plus method is used, the electronic device 201 may establish a BT link with each of the first external electronic device 202 and the second external electronic device 204. When a BLE method (e.g., AoBLE method) is used, the electronic device 201 may establish a BLE link with each of the first external electronic device 202 and the second external electronic device 204.

According to various embodiments, when establishing a communication link or at a specific time after establishing a communication link, the electronic device 201 may determine a communication method and/or a communication property to be used for binaural recording based on various criteria. For example, when it is determined that real-time is important to a binaural recording function, the electronic device 201 may determine to use a communication method that prioritizes real-time through an eSCO communication channel. When it is determined that selection of high sound quality is important, the electronic device 201 may determine to use a communication method that prioritizes stable sound quality through an ACL communication channel. In addition, the electronic device 201 may determine to use a communication method requiring complex advantages through a BLE communication channel such as AoBLE. The electronic device 201 may determine a communication method and/or communication property to be used for the binaural recording function, and may then transmit the determined communication method and/or communication property to the external electronic devices 202 and 204, thereby receiving audio data using a predetermined communication method and/or communication property.

According to various embodiments, in operation 409, the electronic device 201 may determine the occurrence of an event for shooting a video. For example, the electronic device 201 may determine whether a function (or application) for shooting a video or performing a video call has been executed.

According to various embodiments, when an event for shooting a video occurs, in operation 411, the electronic device 201 may determine whether a video shooting or video call function is configured to a binaural mode or a binaural recording mode. For example, the binaural mode (or binaural recording mode) may mean a mode for synchronizing stereo audio data with video during video recording. For example, in the binaural mode (or binaural recording mode), the electronic device 201 may perform video recording using stereo audio data, thereby providing a video recording function having a feeling as if a user hears sound through his/her ears. For example, in the binaural mode (or binaural recording mode), the electronic device 201 may generate video (or video data) through a camera and may receive audio data from at least one external electronic device, thereby providing a function of using stereo audio data for video recording.

According to various embodiments, when the video shooting function is configured to the binaural mode (YES in operation 411), in operation 413, the electronic device 201 may acquire stereo audio data. For example, the electronic device 201 may receive first audio data and second audio data from the plurality of external electronic devices 202 and 204, and may acquire stereo audio data using the first audio data and the second audio data. For example, the electronic device 201 may generate stereo audio data by processing each piece of audio data received with the same time period or with the same sequence number as if each piece of audio data were audio data at the same time point.

According to various embodiments, when the video shooting function is not configured to the binaural mode (NO in operation 411), in operation 415, the electronic device 201 may acquire mono audio data. The electronic device 201 may receive first audio data or second audio data from any one of the plurality of external electronic devices 202 and 204 and may acquire mono audio data using the first audio data or the second audio data. According to various embodiments, when the video shooting function is not configured to the binaural mode (NO in operation 411), in operation 415, the electronic device 201 may acquire mono audio data through a microphone of the electronic device 201.

According to various embodiments, in operation 417, the electronic device 201 may synchronize the acquired audio data (e.g., stereo audio data or mono audio data) with the video. Also, the electronic device 201 may store the synchronized video in a memory (e.g., the memory 230 of FIG. 2) or may output the synchronized video through a display (e.g., the display 260 of FIG. 2).

According to various embodiments, when receiving audio data from at least one external electronic device, the electronic device 201 may output information related to the reception of the audio data through the display (e.g., the display 260 of FIG. 2). For example, whether the microphone of the electronic device 201 is used and/or whether audio data is normally received from at least one external electronic device may be displayed.

Figure 5:
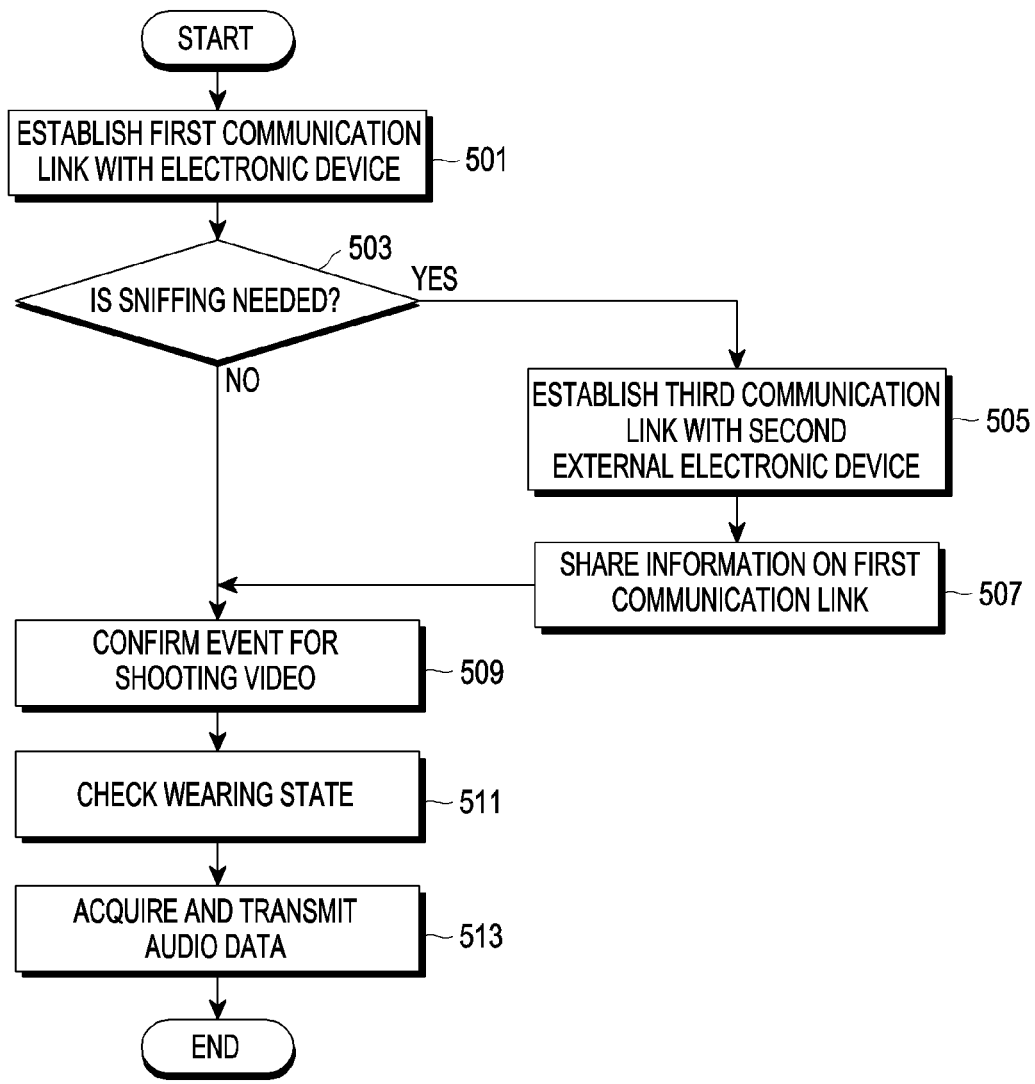
FIG. 5 is a flowchart illustrating a method of transmitting audio data to an electronic device by a first external electronic device according to various embodiments.

FIG. 5 is a flowchart illustrating a method of transmitting audio data to an electronic device by a first external electronic device, according to various embodiments.

Referring to FIG. 5, according to various embodiments, in operation 501, a first external electronic device (e.g., the first external electronic device 202 of FIG. 2) may establish a first communication link with an electronic device (e.g., the electronic device 201 of FIG. 2).

According to various embodiments, in operation 503, the first external electronic device 202 may determine whether a sniffing function is required. However, when the first external electronic device 202 only uses a sniffing topology, the first external electronic device 202 may not determine whether the sniffing function is required. In this case, operation 503 may be omitted.

According to various embodiments, when the sniffing function is required, in operation 505, the first external electronic device 202 may establish a third communication link with the second external electronic device 204. In operation 507, the first external electronic device 202 may share information on the first communication link with the second external electronic device 204 through the third communication link. For example, the information on the first communication link may include at least one information of a Bluetooth address of the electronic device 201, FHS packet information (LT address or piconet clock), a link key, a used channel map, SDP result information, a supported feature, or EIR data. According to an embodiment, the first external electronic device 202 may determine whether the sniffing function is required based on whether the second external electronic device 204 operating in a pair with the first external electronic device 202 and/or establishing a communication link with the first external electronic device 202 is existed. For example, according to the determination result, before establishing the first communication link with the electronic device 201 in operation 501, the first external electronic device 202 may establish a third communication link with the second external electronic device 204.

According to various embodiments, when the sniffing function is not required, in operation 509, the first external electronic device 202 may determine whether an event for shooting a video occurs. For example, when receiving a signal indicating the occurrence of an event for shooting a video from the electronic device 201, the first external electronic device 202 may determine that the event for shooting a video has occurred. For example, the signal indicating the occurrence of the event for shooting a video may include information for requesting audio data from the first external electronic device 202.

According to various embodiments, when it is determined that the event for shooting a video has occurred, in operation 511, the first external electronic device 202 may determine a wearing state of the first external electronic device 202 using a sensor. For example, the first external electronic device 202 may determine whether the first external electronic device 202 is worn on the user's ear using a pressure sensor, a biometric sensor, and/or a proximity sensor.

Meanwhile, the order of operations 509 and 511 may not be limited thereto. For example, operation 511 may be performed first, and operation 509 may be performed later.

According to various embodiments, when it is determined that the first external electronic device 202 is worn on the user, in operation 513, the first external electronic device 202 may acquire first audio data corresponding to ambient sound using a first microphone (e.g., the first microphone 240 of FIG. 2). Also, in operation 513, the first external electronic device 202 may transmit the first audio data to the electronic device 201. According to an embodiment, a time period for transmitting and receiving data may be configured between the first external electronic device 202 and the electronic device 201 and/or the second external electronic device 204. The first external electronic device 202 may transmit data to the electronic device 201 in a designated time period.

According to various embodiments, the first external electronic device 202 may further include an additional microphone in addition to the first microphone. In this case, the first external electronic device 202 may acquire audio corresponding to ambient sound using the additional microphone, and may output the acquired audio through a speaker included in the first external electronic device 202. Through this, the user may check the audio acquired through the first external electronic device 202 in real time.

Figure 6:
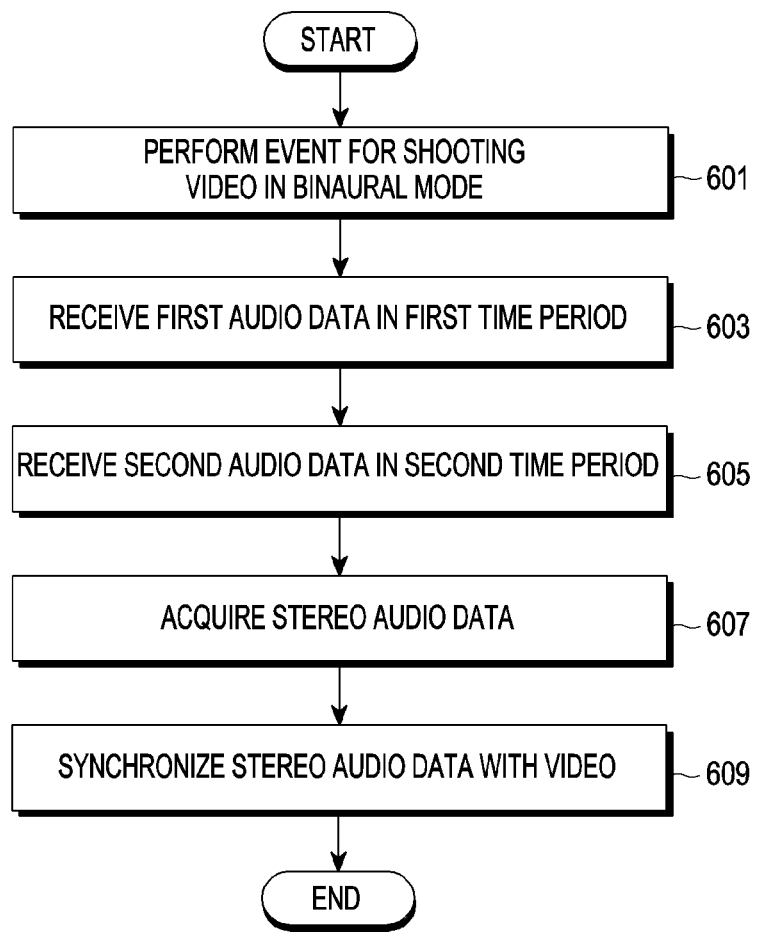
FIG. 6 is a flowchart illustrating a method of shooting a video by an electronic device using a plurality of external electronic devices according to various embodiments.

FIG. 6 is a flowchart illustrating a method of shooting a video by an electronic device using a plurality of external electronic devices, according to various embodiments.

Referring to FIG. 6, according to various embodiments, in operation 601, an electronic device (e.g., the electronic device 201 of FIG. 2) may perform an event for shooting a video in a binaural mode (or binaural recording mode).

According to various embodiments, in operation 603, the electronic device 201 may receive first audio data from a first external electronic device 202 in a predetermined first time period. The first time period may be determined in an operation of establishing a communication link by the electronic device 201 and the first external electronic device 202.

According to various embodiments, in operation 605, the electronic device 201 may receive second audio data from the second external electronic device 204 in a predetermined second time period. For example, the second time period may be determined in an operation of establishing a communication link by the electronic device 201 and the second external electronic device 204. For example, the second time period may be a time period different from the first time period. For example, the first time period and the second time period may have the same length of time when using an eSCO communication method. On the other hand, the first time period and the second time period may have different lengths of time when using an ACL communication method. According to various embodiments, when the first external electronic device 202 and/or the second external electronic device 204 use the sniffing function, the second time period may be determined in an operation of establishing a communication link by the electronic device 201 and the first external electronic device 202. According to various embodiments, when the first external electronic device 202 and/or the second external electronic device 204 use the sniffing function, the electronic device 201 may not know the existence of the second external electronic device 204 (e.g., a device sniffing the first link). According to various embodiments, when the first external electronic device 202 and the second external electronic device 204 use the sniffing function, the first external electronic device 202 may notify the electronic device 201 of the existence of the device sniffing the first link (e.g., the second external electronic device 204).

According to various embodiments, in operation 607, the electronic device 201 may acquire stereo audio data by using first audio data and second audio data.

According to various embodiments, in operation 609, the electronic device 201 may synchronize stereo audio data with video. For example, the electronic device 201 may synchronize stereo audio data with video in consideration of a latency between the stereo audio data and video data. According to various embodiments, the electronic device 201 may synchronize the stereo audio data with the video based on a transmission delay time required to receive first audio data from the first external electronic device 202 and a difference between time required to process first audio data after receiving first audio data and time required for the electronic device 201 to generate video data.

Meanwhile, in a method of operating the electronic device described in the specification, it is described that the electronic device 201 receives the first audio data before the second audio data, but this is only an example, and the technical idea of the disclosure may not be limited thereto. For example, the electronic device 201 may receive audio data according to a predetermined order, and may receive the second audio data before the first audio data.

Figure 7:
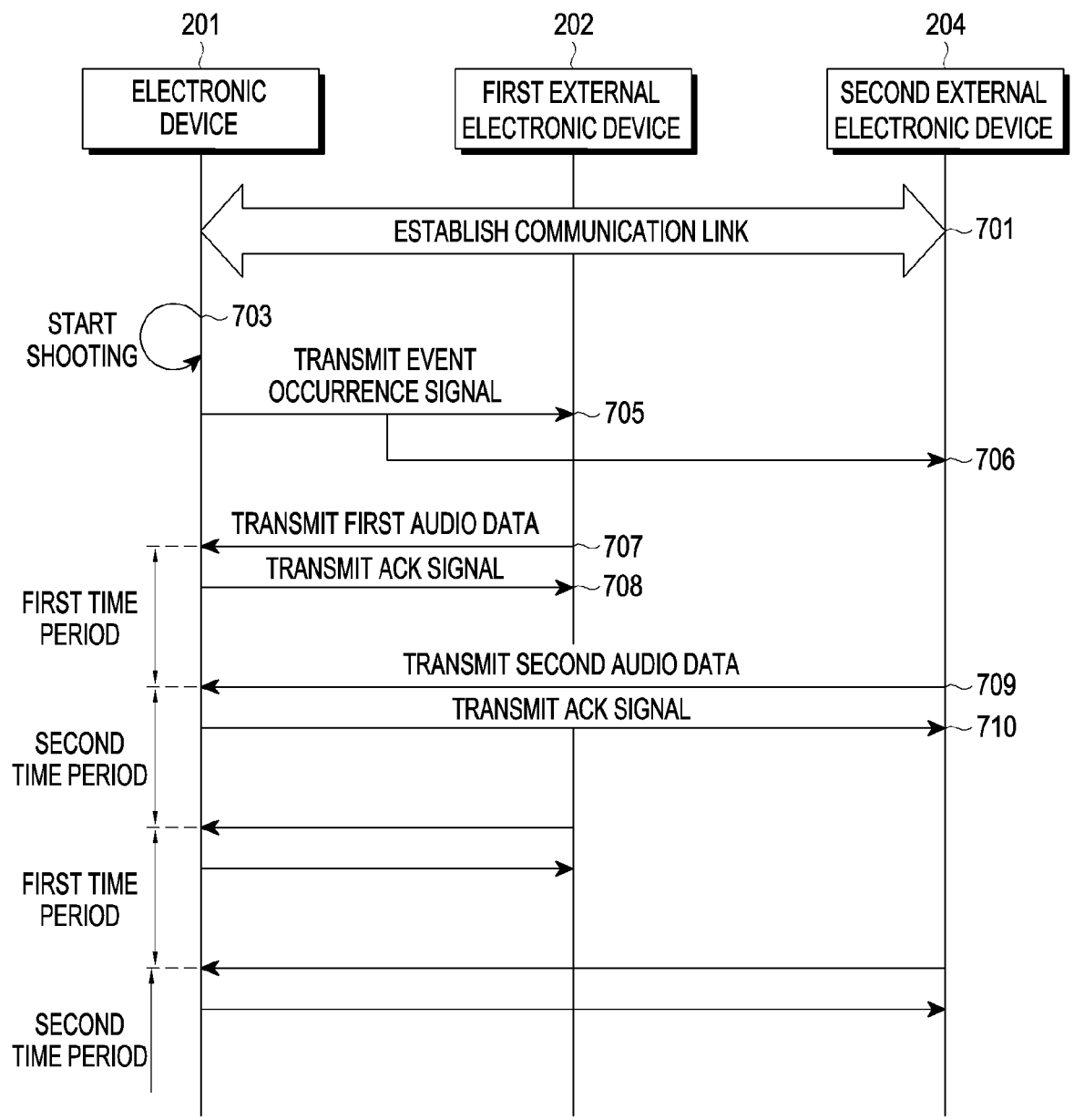
FIG. 7 is a diagram illustrating a method of receiving audio data from a plurality of external electronic devices by an electronic device according to various embodiments.

FIG. 7 is a diagram illustrating a method of receiving audio data from a plurality of external electronic devices by an electronic device, according to various embodiments.

Referring to FIG. 7, according to various embodiments, in operation 701, the electronic device 201 may establish at least one communication link with the first external electronic device 202 and the second external electronic device 204. For example, the electronic device 201 may establish at least one communication link with the first external electronic device 202 and the second external electronic device 204 by the method described with reference to FIGS. 2A and 2B.

According to various embodiments, in operation 703, the electronic device 201 may start an operation of shooting a video based on a binaural mode (or a binaural recording mode). For example, the electronic device 201 may start a video shooting or video call function (or application) in response to a user input, and whether to perform video shooting based on the binaural mode may be configured in advance or determined according to the user input. For example, the electronic device 201 may provide a notification recommending that a user shoot a video in the binaural mode in a specific place (e.g., a concert hall, a beach, or an amusement park). Alternatively, the electronic device 201 may be configured to shoot a video in the binaural mode in the specific place (e.g., a concert hall, a beach, or an amusement park) according to a user input.

According to various embodiments, in operation 705, the electronic device 201 may transmit a signal indicating the occurrence of an event to the first external electronic device 202 through a first communication link established by the first external electronic device 202. In operation 706, the electronic device 201 may transmit the signal indicating the occurrence of an event to the second external electronic device 204 through the first communication link. Alternatively, the electronic device 201 may transmit the signal indicating the occurrence of an event to the second external electronic device 204 through a second communication link established by the second external electronic device 204. According to various embodiments, when the second external electronic device 204 is operated in a sniffing mode, the second external electronic device 204 may receive a signal transmitted to the first external electronic device 202 by the electronic device 201 through the first communication link. In this case, operation 706 may be omitted.

According to various embodiments, in operation 707, the electronic device 201 may receive first audio data transmitted by the first external electronic device 202, in a predetermined first time period. In operation 708, the electronic device 201 may transmit, in the predetermined first time period, an acknowledgement (ACK) signal to the first external electronic device 202 when the first audio data is received. Alternatively, when the first audio data is not received, the electronic device 201 may transmit a negative acknowledgement (NACK) signal to the first external electronic device 202.

According to various embodiments, in operation 709, the electronic device 201 may receive second audio data transmitted by the second external electronic device 204 in a second predetermined time period. In operation 710, the electronic device 201 may transmit, in the second predetermined time period, an ACK signal to the second external electronic device 204 when the second audio data is received. Alternatively, when the second audio data is not received, the electronic device 201 may transmit an NACK signal to the second external electronic device 204.

According to various embodiments, when the second external electronic device 204 operates in a sniffing mode, the electronic device 201 and the first external electronic device 202 may be configured to allow the first external electronic device 202 to transmit additional information in the second time period or allow the second external electronic device 204 to transmit the second audio data to the electronic device 201 through the first communication link.

According to various embodiments, the electronic device 201 may repeatedly perform operations 707 to 710 until the operation of shooting a video is terminated.

According to various embodiments of the disclosure, the following FIGS. 8A, 8B, 9A, and 9B may relate to a method of receiving audio data from a plurality of external electronic devices by an electronic device based on a sniffing method. However, these embodiments in which an electronic device of the disclosure receives audio data from a plurality of external electronic devices, and the technical idea of the disclosure are not be limiting.

Figure 8B:
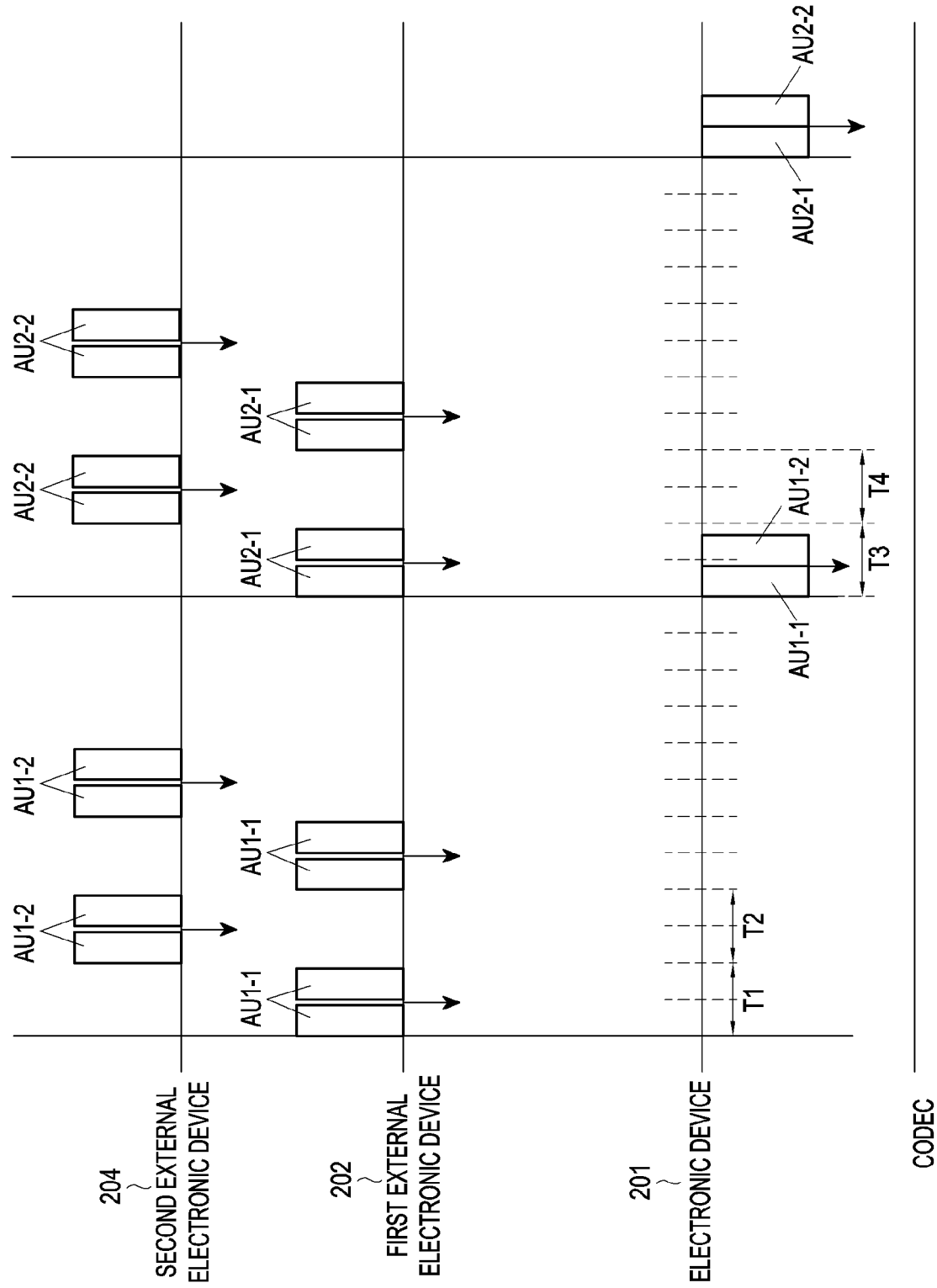
FIG. 8B is a diagram illustrating method of receiving audio data from a plurality of external electronic devices by an electronic device according to various embodiments.

FIG. 8A is a diagram illustrating a method of receiving audio data from a plurality of external electronic devices by an electronic device, according to various embodiments, and FIG. 8B is a diagram illustrating method of receiving audio data from a plurality of external electronic devices by an electronic device, according to various embodiments.

Referring to FIG. 8A, according to various embodiments, the electronic device 201 may receive first audio data AU1-1 and second audio data AU1-2 through an eSCO communication link.

According to various embodiments, the electronic device 201 may receive the first audio data AU1-1 from the first external electronic device 202 in a first time period (e.g., T1). When the first audio data AU1-1 is received, the electronic device 201 may transmit a first ACK signal ACK1-1 to the first external electronic device 202 in the first time period (e.g., T1). For example, the first time period T1 may be a TeSCO time period. Alternatively, the first time period T1 may be a time period indicating the start of TeSCO. For example, the first audio data AU1-1 may be data encoded by the first external electronic device 202 or raw data without separate encoding performed thereon, after first sound is introduced into a first microphone 240 of the first external electronic device 202.

According to various embodiments, the electronic device 201 may receive second audio data AU1-2 from the second external electronic device 204 in a second time period T2. When the second audio data AU1-2 is received, the electronic device 201 may transmit a second ACK signal ACK1-2 to the second external electronic device 204. For example, the second time period T2 may be a WeSCO time period. Alternatively, the second time interval T1 may be a time period indicating the start of WeSCO. For example, the second audio data AU1-2 may be data encoded by the second external electronic device 204 or raw data without separate encoding performed thereon, after second sound is introduced into a second microphone 250 of the second external electronic device 204.

According to various embodiments, after receiving the first audio data AU1-1 and the second audio data AU1-2, the electronic device 201 may receive the next first audio data AU2-1 and second audio data AU2-2.

According to various embodiments, the electronic device 201 may receive the first audio data AU2-1 from the first external electronic device 202 in a first time period (e.g., T3). The electronic device 201 may transmit a first ACK signal ACK2-1 or a first NACK signal NACK2-1 to the first external electronic device 202 in the first time period (e.g., T3) according to whether the first audio data AU2-1 is received. For example, when the first audio data AU2-1 is received, the electronic device 201 may transmit the first ACK signal ACK2-1 to the first external electronic device 202 in the first time period (e.g., T3). Alternatively, when the first audio data AU2-1 is not normally received, the electronic device 201 may transmit the first NACK signal NACK2-1 to the first external electronic device 202 in the first time period (e.g., T3). When the first NACK signal NACK2-1 is received, the first external electronic device 202 may retransmit the first audio data AU2-1 to the electronic device 201 in the next first time period (e.g., a first time period after a second time period (e.g., T4)). When the first audio data AU2-1 is received, the electronic device 201 may transmit the first ACK signal ACK2-1 to the first external electronic device 202 in the next first time period.

According to various embodiments, the electronic device 201 may receive second audio data AU2-2 from the second external electronic device 204 in a second time period (e.g., T4). The electronic device 201 may transmit a second ACK signal ACK2-2 or a second NACK signal NACK2-2 to the second external electronic device 204 in the second time period (e.g., T4) according to whether the second audio data AU2-2 is received. For example, when the second audio data AU2-2 is received, the electronic device 201 may transmit the second ACK signal ACK2-2 to the second external electronic device 204 in the second time period (e.g., T4). Alternatively, when the second audio data AU2-2 is not normally received, the electronic device 201 may transmit the second NACK signal NACK2-2 to the second external electronic device 204 in the second time period (e.g., T4). When the second NACK signal NACK2-2 is received, the second external electronic device 204 may retransmit the second audio data AU2-2 to the electronic device 201. When the second NACK signal NACK2-2 is received, the second external electronic device 204 may retransmit the second audio data AU2-2 to the electronic device 201 in the next second time period (e.g., a second time period after the next first time period). When the second audio data AU2-2 is received, the electronic device 201 may transmit the second ACK signal ACK2-2 to the second external electronic device 204 in the next second time period.

According to various embodiments, the electronic device 201 may sequentially receive the first audio data AU2-1 and second audio data AU2-2. According to various embodiments, the electronic device 201 may transmit the first audio data (e.g., AU1-1 or AU1-2) received from the first external electronic device 202 and the second audio data (e.g., AU2-1 or AU2-2) received from the second external electronic device 204 through a codec. For example, the electronic device 201 may transmit the first audio data (e.g., AU1-1) and the second audio data (e.g., AU2-1) before receiving the next first audio data (e.g., AU1-2) and second audio data (e.g., AU2-2) or at the same time as when the next first audio data (e.g., AU1-2) and second audio data (e.g., AU2-2) are substantially received.

According to various embodiments, the electronic device 201 may repeatedly perform the above-described operation until the operation of shooting a video is terminated.

Referring to FIG. 8B, according to various embodiments, the electronic device 201 may receive first audio data and second audio data through an eSCO communication link. However, the electronic device 201 of FIG. 8B may receive the first audio data and the second audio data without transmitting an ACK signal to the external electronic devices 202 and 204, as compared with FIG. 8A. For example, in a time period for receiving the ACK signal (e.g., ACK1-1 or ACK1-2) of FIG. 8A from the electronic device 201, the first external electronic device 202 and the second external electronic device 204 may additionally transmit the first audio data (e.g., AU1-1 or AU1-2) and the second audio data (e.g., AU2-1 or AU2-2).

According to various embodiments, when the electronic device 201 uses the eSCO communication method as shown in FIGS. 8A and 8B, each of the time periods for acquiring the first audio data and the second audio data may have the same length of time.

Figure 9A:
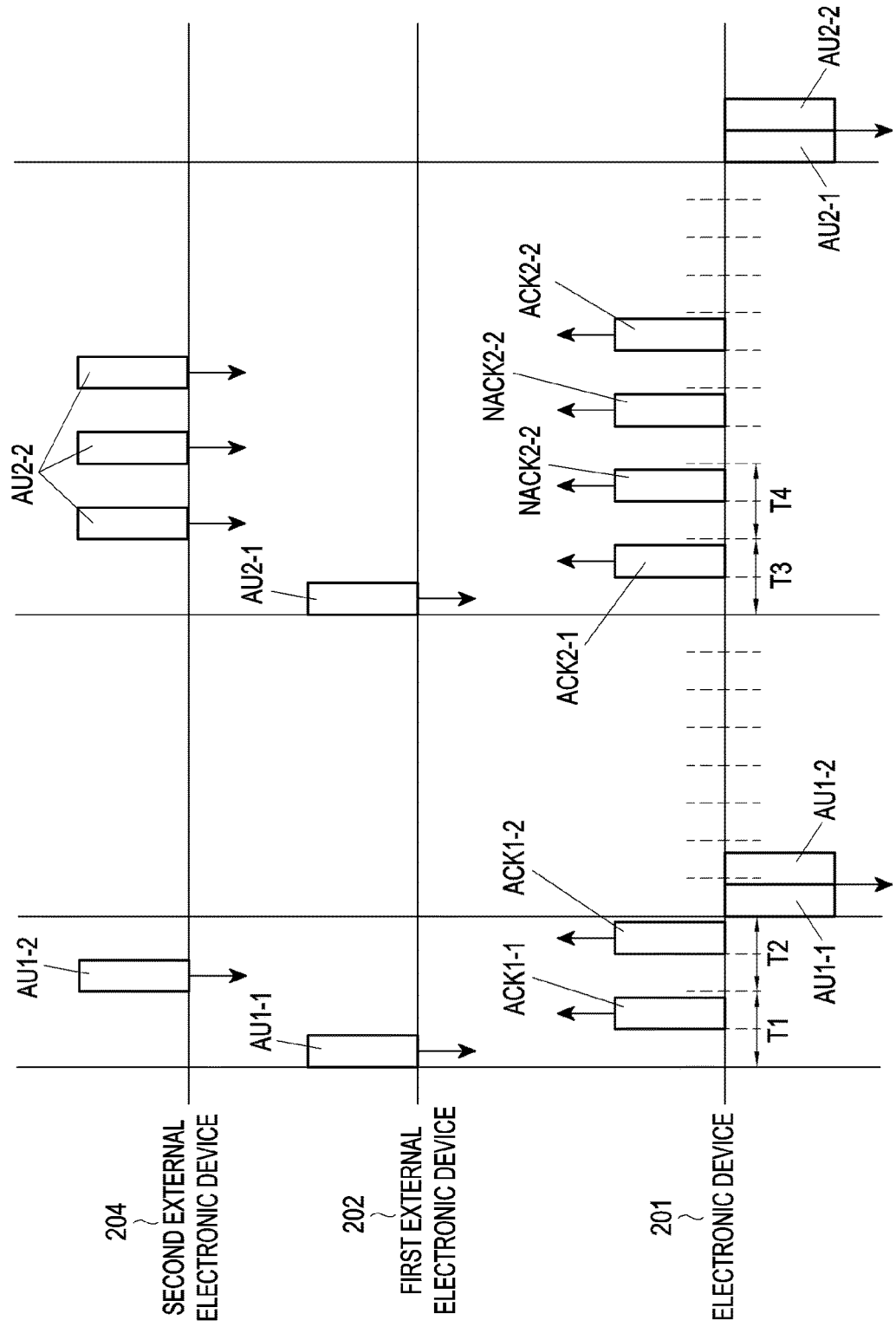
FIG. 9A is a diagram illustrating a method of receiving audio data from a plurality of external electronic devices by an electronic device according to various embodiments.

FIG. 9A is a diagram illustrating a method of receiving audio data from a plurality of external electronic devices by an electronic device, according to various embodiments, and FIG. 9B is a diagram illustrating a method of receiving audio data from a plurality of external electronic devices by an electronic device, according to various embodiments.

Referring to FIG. 9A, according to various embodiments, the electronic device 201 may receive first audio data and second audio data through an ACL communication link.

According to various embodiments, the electronic device 201 may receive first audio data AU1-1 from the first external electronic device 202 in a first time period T1. When the first audio data AU1-1 is received, the electronic device 201 may transmit a first ACK signal ACK1-1 to the first external electronic device 202. The electronic device 201 may receive second audio data AU1-2 from the second external electronic device 204 in a second time period T2. When the second audio data AU1-2 is received, the electronic device 201 may transmit a second ACK signal ACK1-2 to the second external electronic device 204. For example, the first external electronic device 202 and the second external electronic device 204 may transmit the first audio data AU1-1 and the second audio data AU1-2, respectively, in a predetermined order or in predetermined first time period T1 and second time period T2.

According to various embodiments, after sequentially receiving the first audio data AU1-1 and the second audio data AU1-2, the electronic device 201 may transmit the received first audio data AU2-1 and second audio data AU2-2 through a codec.

According to various embodiments, the electronic device 201 may receive the next first audio data AU2-1 and second audio data AU2-2. For example, the electronic device 201 may receive the first audio data AU2-1 from the first external electronic device 202 in the first time period. When the first audio data AU2-1 is received, the electronic device 201 may transmit a first ACK signal ACK2-1 to the first external electronic device 202.

According to various embodiments, the electronic device 201 may receive the second audio data AU2-2 from the second external electronic device 204 in the second time period. When the second audio data AU2-2 is not received within the second time period, the electronic device 201 may transmit a second NACK signal NACK2-2 to the second external electronic device 204. When the second audio data AU2-2 is received within the second time period, the electronic device 201 may transmit a second ACK signal ACK2-2 to the second external electronic device 204.

According to various embodiments, when failing to receive the second ACK signal ACK2-2 from the electronic device 201 while retransmitting the second audio data AU2-2 for a designated number of times or for a designated time, the second external electronic device 204 may transmit second audio data AU3-2 corresponding to the next turn to the electronic device 201. In this case, the second external electronic device 204 may transmit the second audio data AU3-2 to the electronic device 201 in a second time period corresponding to the next turn.

According to various embodiments, the first external electronic device 202 may transmit the first audio data AU1-1 or AU2-1, and may retransmit the first audio data AU1-1 or AU2-1 after the second time period (T2 or T4) when failing to receive the first ACK signal (ACK1-1 or ACK2-1) from the electronic device 201. According to various embodiments, when failing to receive an ACK signal (e.g., the first ACK signal and the second ACK signal) from the electronic device 201, each of the first external electronic device 202 and the second external electronic device 204 may retransmit the audio data (e.g., the first audio data or the second audio data) in a designated order and/or at a designated time after the second time period (T2 or T4).

According to various embodiments, when failing to receive the first audio data and/or the second audio data, the electronic device 201 may generate stereo audio data using the audio data received through a microphone included in the electronic device 201, and may synchronize the generated stereo audio data with a video acquired through a camera (e.g., the camera 280 of FIG. 2).

According to various embodiments, after sequentially receiving the first audio data AU2-1 and the second audio data AU2-2, the electronic device 201 may transmit the first audio data AU2-1 and the second audio data AU2-2 through a codec.

Referring to FIG. 9B, according to various embodiments, the electronic device 201 may receive the first audio data and the second audio data through an ACL communication link. However, as compared to FIG. 9A, the electronic device 201 of FIG. 9B may receive first audio data and second audio data without transmitting an ACK signal to external electronic devices 202 and 204. For example, in a time period for receiving the ACK signal (e.g., ACK1-1 or ACK1-2) of FIG. 9A from the electronic device 201, the first external electronic device 202 and the second external electronic device 204 may additionally transmit the first audio data (e.g., AU1-1 or AU1-2) and second audio data (AU2-1 or AU2-2). According to various embodiments, the first external electronic device 202 and the second external electronic device 204 may transmit audio data (e.g., the first audio data and/or the second audio data) to the electronic device 201 a designated number of times in a designated order and a designated time period.

According to various embodiments, when using the ACL communication method as shown in FIGS. 9A and 9B described above, each of the time periods for acquiring the first audio data and the second audio data may have a different time length.

According to various embodiments, the electronic device 201 may repeatedly perform the above-described operation until the operation of shooting a video is terminated.

The number of time slots illustrated in FIGS. 8A, 8B, 9A, and 9B is for convenience of description, and the technical idea of the disclosure may not be limited thereto. For example, when the first communication link between the electronic device 201 and the first external electronic device 202 is a communication link using the eSCO method, the first communication link may be configured to include a transmission/reception period (TeSCO) of 16 slots and a retransmission period (WeSCO) of 4 slots.

Figure 10:
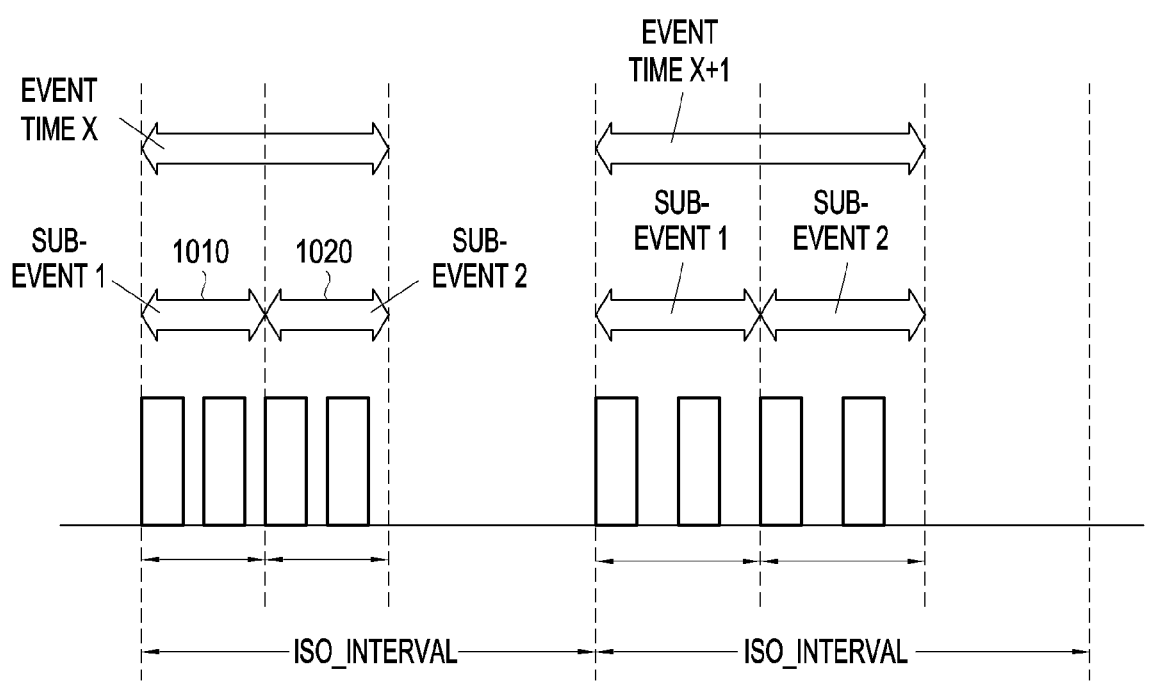
FIG. 10 is a diagram illustrating a method of receiving audio data from a plurality of external electronic devices by an electronic device according to various embodiments.

FIG. 10 is a diagram illustrating a method of receiving audio data from a plurality of external electronic devices by an electronic device according to various embodiments.

Referring to FIG. 10, according to various embodiments, the electronic device 201 may receive first audio data and second audio data through a BLE communication link. For example, the electronic device 201 may receive the first audio data and the second audio data through an AoBLE communication link among various BLE communication links.

According to various embodiments, the electronic device 201 may allocate an event time for the first external electronic device 202 and the second external electronic device 204 and sub-event periods within the corresponding event time. Next, the electronic device 201 may receive the first audio data and the second audio data from each of the sub-event sections. For example, in a case in which the electronic device 201 uses the AoBLE communication link, all time periods (e.g., an event time period and sub-event time periods within a corresponding event time period) may be determined when the electronic device 201 establishes a communication link with the first external electronic device 202 and/or the second external electronic device 204. In addition, at least some of the time periods (e.g., the event time period and the sub-event time periods within the corresponding time period) may be appropriately adjusted to a resource through a specific message as needed after the communication link is established. According to various embodiments, when the electronic device 201 receives the first audio data from the first external electronic device 202 and the second audio data from the second external electronic device 204 through one link such as in a sniffing method, a first sub-event period 1010 and a second sub-event period 1020 may be time periods allocated to the same link. According to various embodiments, when the electronic device 201 receives the first audio data from the first external electronic device 202 and the second audio data from the second external electronic device 204 through a plurality of links, the first sub-event period 1010 and a second sub-event period 1020 may be time periods allocated to different links.

According to various embodiments, the electronic device 201 may allocate "event time X" and the first sub-event period 1010 and the second sub-event period 1020 included in "event time X". The electronic device 201 may receive the first audio data from the first external electronic device 202 in the first sub-event period 1010, and may receive the second audio data from the second external electronic device 204 in the second sub-event period 1020.

According to various embodiments, the electronic device 201 may repeatedly perform the above-described operation until the operation of shooting a video is terminated.

Figure 11:
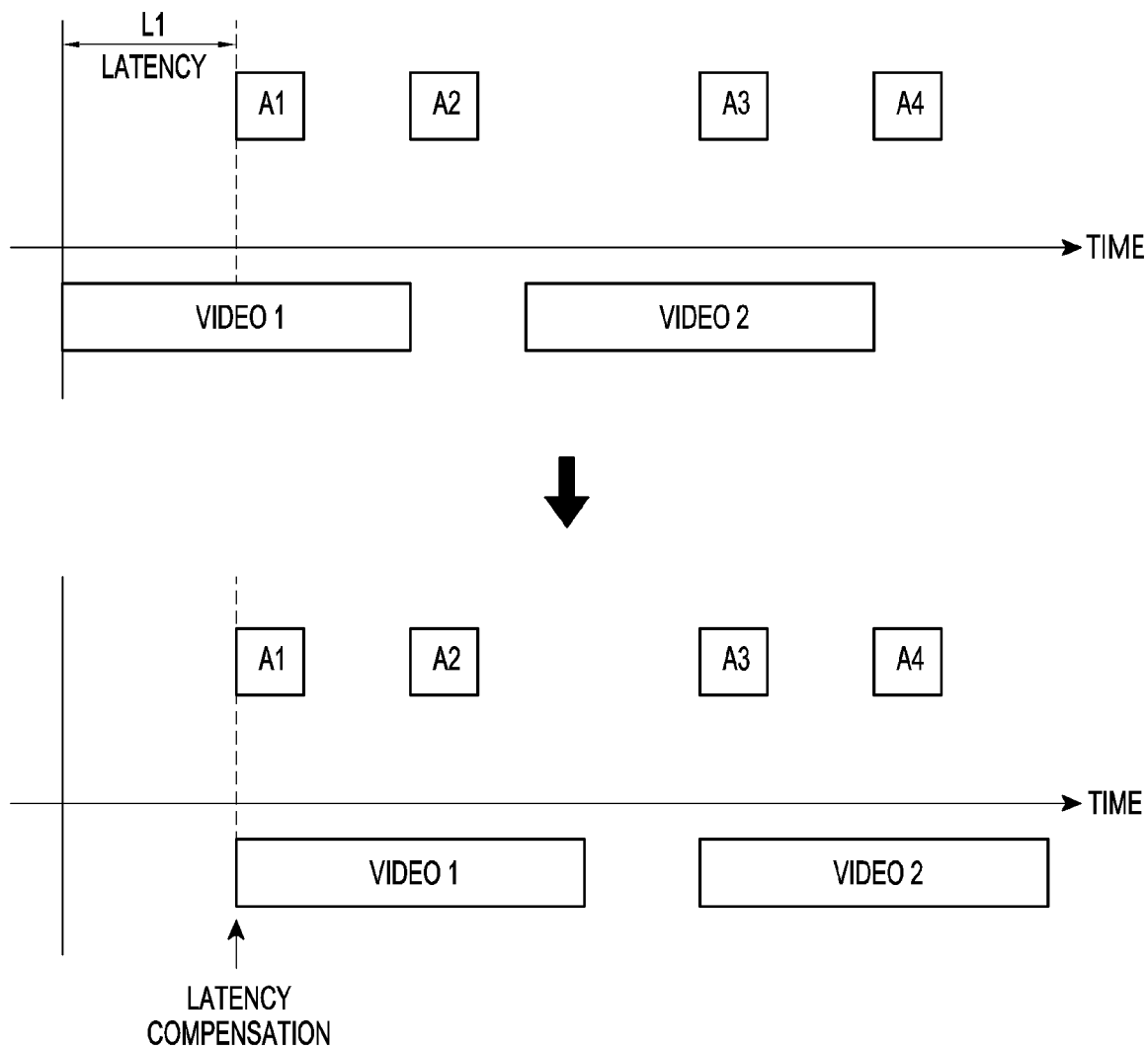
FIG. 11 is a diagram illustrating a method of synchronizing video and audio data by an electronic device, according to various embodiments.

FIG. 11 is a diagram illustrating a method of synchronizing video and audio data by an electronic device, according to various embodiments.

Referring to FIG. 11, according to various embodiments, an electronic device (e.g., the electronic device 201 of FIG. 2) may synchronize stereo audio data (e.g., A1 to A4) with video data (e.g., first video and second video) acquired through a camera (e.g., the camera 280 of FIG. 2). For example, the electronic device 201 may synchronize stereo audio data with video data by compensating for a latency L1 between audio data (e.g., first audio data A1) and video data (e.g., first video). For example, the electronic device 201 may synchronize stereo audio data with the video data by delaying the video data by time corresponding to the latency L1.

According to various embodiments, the electronic device 201 may confirm a transmission delay time required for first sound input to a first microphone 240 of the first external electronic device 202 to be received by the electronic device 201 as first audio data (audio data corresponding to the first sound). For example, the electronic device 201 may confirm the transmission delay time based on time information when the first external electronic device 202 generates the first audio data, time information when the first external electronic device 202 transmits the first audio data, and/or time information when the electronic device 201 receives the first audio data. In addition, after receiving the first audio data, the electronic device 201 may confirm time required to process the first audio data for each layer of the electronic device 201. The electronic device 201 may acquire a latency L1 between the audio data and the video data based on the transmission delay time required to receive the first audio data from the first external electronic device 202 and the time required to process the first audio data.

According to various embodiment, the electronic device 201 may synchronize the audio data with the video data by compensating for the latency L1 between the audio data and the video data. Also, the electronic device 201 may store the synchronized data in a memory (e.g., the memory 230 of FIG. 2) or may output the synchronized data through a display (e.g., the display 260 of FIG. 2).

According to various embodiments, a latency between the first video data and the audio data (e.g., A1 and/or A2) and a latency between the second video data and the audio data (e.g., A3 and/or A4) may be the same or different. For example, when the latency between the first video data and the first audio data A1 and the latency between the second video data and the third audio data A3 are the same, the latency between the first video data and the first audio data A1 may be applied to the video data (e.g., the first video data and the second video data). For another example, when the latency between the first video data and the first audio data A1 and the latency between the second video data and the third audio data A3 are different, a latency between the second video data and third audio data A3 may be confirmed and applied to the second video data.

FIGS. 12A, 12B, 12C, 12D, and 12E are user interfaces illustrating a method of shooting a video by an electronic device using a plurality of external electronic devices according to various embodiments.

Figure 12A:
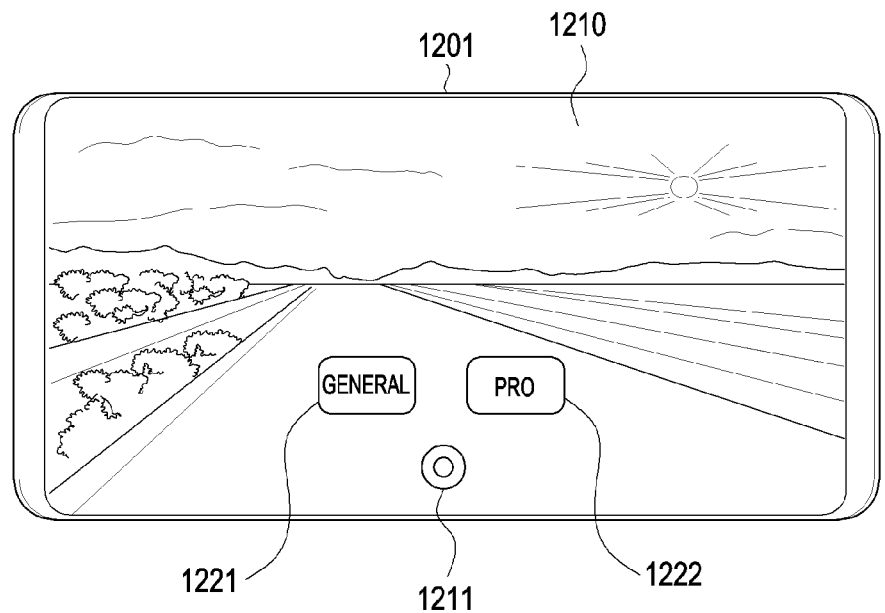
FIGS. 12A, 12B, 12C, 12D, and 12E are user interfaces illustrating a method of shooting a video by an electronic device using a plurality of external electronic devices according to various embodiments.

Referring to FIG. 12A, according to various embodiments, an electronic device 1201 (e.g., the electronic device 201 of FIG. 2) may display a preview screen 1210 when a video shooting function (or video recording) is performed.

According to various embodiments, the electronic device 1201 may display a recording start object 1211 on the preview screen 1210. Also, the electronic device 1201 may display a first shooting object 1221 and a second shooting object 1222 on the preview screen 1210. For example, when a user input for the recording start object 1211 is confirmed, the electronic device 1201 may start a general recording operation.

Figure 12B:
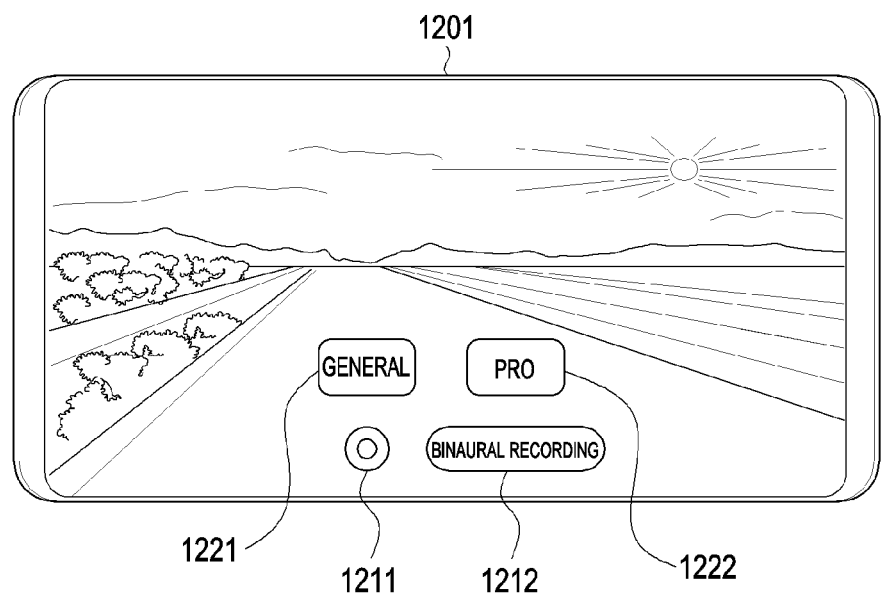

Referring to FIG. 12B, when a user input for the second shooting object 1222 is confirmed, the electronic device 1201 may display a binaural recording object 1212. For example, when a user input for the binaural recording object 1212 is confirmed, the electronic device 1201 may perform a binaural recording operation. After the binaural recording object 1212 is displayed, the electronic device 1201 may check the wearing states of the external electronic devices (e.g., the external electronic devices 202 and 204 of FIG. 2).

Figure 12C:
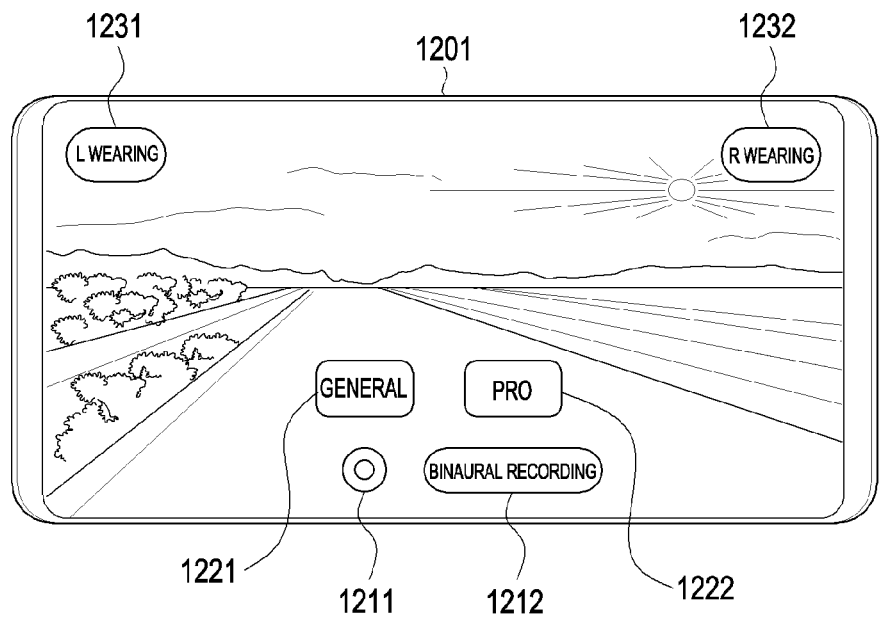

Referring to FIG. 12C, the electronic device 1201 may display objects 1231 and 1232 indicating the wearing states of the external electronic devices (e.g., the external electronic devices 202 and 204 of FIG. 2). For example, when the external electronic devices are a right earphone and a left earphone, the electronic device 1201 may display the first object 1231 indicating the wearing state of the left earphone and the second object 1232 indicating the wearing state of the right earphone. For example, the electronic device 1201 may display the first object 1231 when the left earphone is normally worn, and may display the second object 1232 when the right earphone is normally worn. Alternatively, the electronic device 1201 may display the first object 1231 and the second object 1232 having different colors depending on whether they are worn. For example, the electronic device 1201 may display the first object 1231 in blue when the left earphone is worn, and may display the second object 1232 in red when the right earphone is not worn.

According to various embodiments, in a state in which at least some of the objects 1231 and 1232 indicating the wearing states of the external electronic devices 202 and 204 are displayed, the electronic device 1201 may start the binaural recording object 1212 when the user input for the binaural recording object 1212 is confirmed. According to various embodiments, the electronic device 1201 may start the binaural recording operation only when both the right earphone and the left earphone are normally worn. For example, when at least one of the right earphone and the left earphone is not normally worn, the electronic device 1201 may display the binaural recording object 1212 in an inactive state. Alternatively, when the at least one of the right earphone and the left earphone is not normally worn, the electronic device 1201 may not display the binaural recording object 1212 even if the user input for the second shooting object 1222 is confirmed. In addition, when the at least one of the right earphone and the left earphone is not normally worn, the electronic device 1201 may display a message recommending wearing the earphone.

According to various embodiments, when the video shooting (or video recording) function is performed, the electronic device 1201 may check the wearing states of external electronic devices (e.g., the external electronic devices 202 and 204 of FIG. 2), and may display the binaural recording object 1212 on the preview screen 1210 based on the checked wearing states of the external electronic devices. For example, the electronic device 1201 may display the binaural recording object 1212 in an inactive state or may not display the binaural recording object 1212 in a state in which the external electronic devices are not normally worn.

Figure 12D:
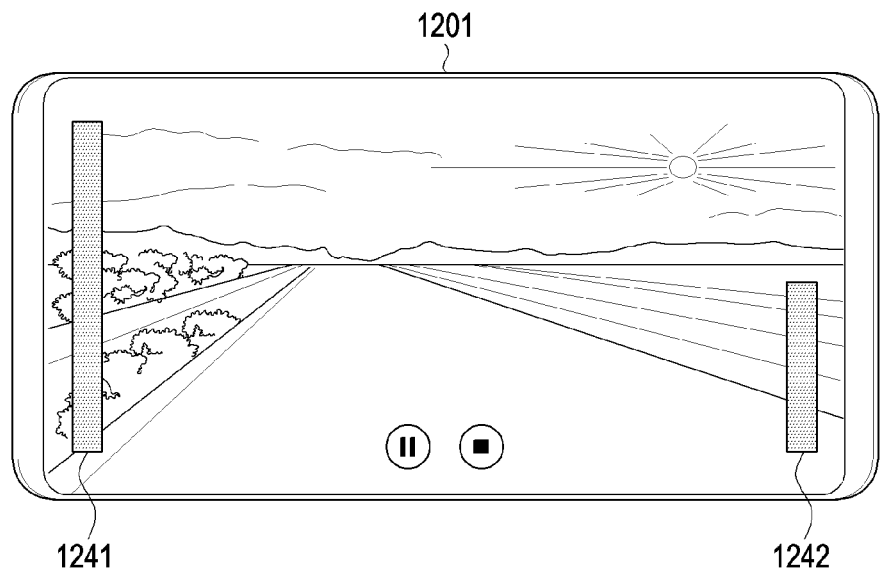

Referring to FIG. 12D, according to various embodiments, when the binaural recording operation starts, the electronic device 1201 may display a first status bar 1241 indicating the state of the first audio data and a second status bar 1242 indicating the state of the second audio data. For example, the first status bar 1241 may indicate at least one of a reception state, a volume, and sound quality of audio data received from the left earphone. Also, the second status bar 1242 may indicate at least one of a reception state, a volume, and sound quality of audio data received from the right earphone. For example, the electronic device 1201 may display the first status bar 1241 corresponding to the left earphone on the left area of the display (e.g., the display 260 of FIG. 2), and may display the second status bar 1242 corresponding to the right earphone on right area of the display 260.

Figure 12E:
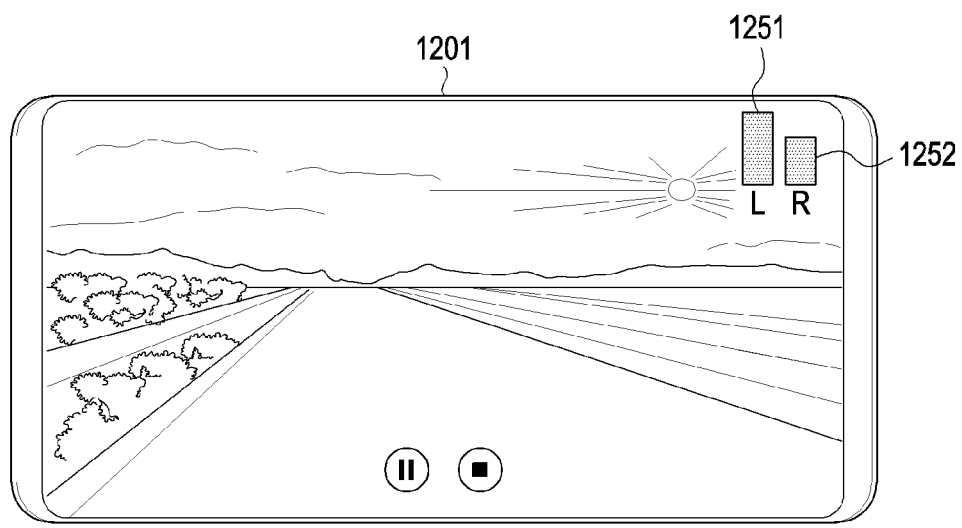

Referring to FIG. 12E, according to various embodiments, the electronic device 1201 may display a first status bar 1251 and a second status bar 1252 on the upper right area of the display (e.g., the display 260 of FIG. 2). For example, the first status bar 1251 and the second status bar 1252 may have a size smaller than the first status bar 1241 and the second status bar 1242 of FIG. 12C.

The electronic device 201 according to various embodiments may include a camera 280; a display 260; a communication module 290 supporting Bluetooth communication; and a processor 220. The processor may be configured to establish at least one communication link with a plurality of external electronic devices 202 and 204 through the communication module; transmit a first signal indicating an occurrence of an event using the camera to at least one of the plurality of external electronic devices through the at least one communication link; receive audio data corresponding to sound acquired by each of the plurality of external electronic devices, from each of the plurality of external electronic devices in predetermined time periods through the at least one communication link in a state in which the plurality of external electronic devices are worn; and synchronize the audio data with video acquired using the camera and store the synchronized data, based on time and an order at which each of the plurality of external electronic devices acquires the sound.

The processor may be configured to sequentially receive first audio data corresponding to first sound acquired by the first external electronic device 202 among the plurality of external electronic devices and second audio data corresponding to second sound acquired by the second external electronic device 204 among the plurality of external electronic devices; and acquire stereo audio data using the first audio data and the second audio data.

The processor may be configured to receive the first audio data in a predetermined first time period and receive the second audio data in a predetermined second time period.

The processor may be configured to transmit a first ACK signal to the first external electronic device in the first time period when the first audio data is received and transmit a second ACK signal to the second external electronic device in the second time period when the second audio data is received.

The first external electronic device may include an earphone in a first direction, and the second external electronic device may include an earphone in a second direction.

The processor may be configured to check a wearing state of each of the first external electronic device and the second external electronic device; and display information on the wearing state through the display.

The processor may be configured to receive the first audio data through a first communication link established with the first external electronic device; and receive the second audio data through a second communication link established with the second external electronic device.

The processor may be configured to receive the first audio data from the first external electronic device through a first communication link established with the first external electronic device; and receive the second audio data from the second external electronic device using the first communication link.

The processor may be configured to confirm a latency required for acquiring the audio data; and synchronize the audio data with the video based on the latency.

The processor may be configured to receive the audio data from each of the plurality of external electronic devices using at least one of an extended synchronous connections (eSCO) communication channel, an asynchronous connection-less (ACL) communication channel, and a BLE communication channel.

A method of operating the electronic device 201 according to various embodiments may include establishing at least one communication link with the plurality of external electronic devices 202 and 204; transmitting a first signal indicating an occurrence of an event using the camera 280 included in the electronic device to at least one of the plurality of external electronic devices through the at least one communication link; receiving audio data corresponding to sound acquired by each of the plurality of external electronic devices, from each of the plurality of external electronic devices in predetermined time periods through the at least one communication link in a state in which the plurality of external electronic devices are worn; and synchronizing the audio data with video acquired using the camera and storing the synchronized data, based on time and an order at which each of the plurality of external electronic devices acquires the sound.

The receiving of the audio data may include receiving first audio data corresponding to first sound acquired by the first external electronic device 202 among the plurality of external electronic devices and second audio data corresponding to second sound acquired by the second external electronic device 204 among the plurality of external electronic devices; and acquiring stereo audio data using the first audio data and the second audio data.

The receiving of the audio data may include sequentially receiving the first audio data in a predetermined first time period and receiving the second audio data in a predetermined second time period.

The method of operating the electronic device may further include transmitting a first ACK signal to the first external electronic device in the first time period when the first audio data is received; and transmitting a second ACK signal to the second external electronic device in the second time period when the second audio data is received.

The method of operating the electronic device may further include checking a wearing state of each of the first external electronic device and the second external electronic device; and displaying information on the wearing state through the display.

The receiving of the audio data may further include receiving the first audio data through a first communication link established with the first external electronic device; and receiving the second audio data through a second communication link established with the second external electronic device.

The receiving of the audio data may further include receiving the first audio data from the first external electronic device through a first communication link established with the first external electronic device; and receiving the second audio data from the second external electronic device using the first communication link.

The method of operating the electronic device may further include displaying a first status bar corresponding to the first audio data and a second status bar corresponding to the second audio data on the display of the electronic device.

The electronic device 202 or 204 according to various embodiments may include a sensor; at least one microphone; a communication module supporting Bluetooth communication; and a processor. The processor may be configured to establish a communication link with external electronic devices through the communication module; receive a first signal indicating an occurrence of an event of acquiring video using a camera of the external electronic device from the external electronic device through the communication link; acquiring audio data corresponding to ambient sound through the at least one microphone in a state in which the electronic device is worn; and transmit the audio data to the external electronic device in a predetermined time period through the communication module.

The processor may be configured to check a wearing state of the electronic device through the sensor; and transmit information on the wearing state to the external electronic device through the communication module.

Each of the elements of the electronic device may be configured by one or more components and a name of the corresponding element may vary depending on a type of the electronic device. In various embodiments, the electronic device may be configured to include at least one of the above-described elements. Some of the above-described elements may be omitted from the electronic device, or the electronic device may further include additional elements. In addition, some of the elements of the electronic device according to the various embodiments may be combined to form a single entity and thus may perform the same functions of the corresponding elements prior to the combination.

The embodiments disclosed herein are merely provided to easily describe the disclosure and to facilitate understanding of the disclosure but are not intended to limit the scope of the disclosure. Therefore, it should be construed that all modifications and changes based on the technical idea of the disclosure or various other embodiments fall within the scope of the disclosure.

Although the present disclosure has been described with various embodiments, various changes and modifications may be suggested to one skilled in the art. It is intended that the present disclosure encompass such changes and modifications as fall within the scope of the appended claims.

The invention claimed is:

1. An electronic device comprising:
   a camera;
   a display;
   a communication circuit configured to support Bluetooth communication; and
   a processor, wherein the processor is configured to:
   establish at least one communication link with a plurality of external electronic devices through the communication circuit;
   perform an event for capturing video data using the camera in a binaural mode;
   transmit a first signal indicating an occurrence of the event to at least one of the plurality of external electronic devices through the at least one communication link;
   while capturing the video data using the camera, receive first audio data corresponding to a first sound acquired by a first external electronic device among the plurality of external electronic devices, in a first time period, and second audio data corresponding to a second sound acquired by a second external electronic device among the plurality of external electronic devices, in a second time period different from the first time period, through the at least one communication link in a state in which the plurality of external electronic devices are worn on a user's body;
   acquire stereo audio data using the first audio data and the second audio data, based on time and sequence at which the first external electronic device and the second external electronic device acquire the first sound and the second sound, respectively;
   identify a latency between the stereo audio data and the video data based on a first delay time for receiving the first audio data and the second audio data and a second delay time for acquiring the stereo audio data; and
   synchronize and store the stereo audio data with the video data captured using the camera, based on the latency between the stereo audio data and the video data.

2. The electronic device of claim 1, wherein the processor is configured to:
   transmit a first acknowledgement (ACK) signal to the first external electronic device in the first time period when the first audio data is received; and
   transmit a second ACK signal to the second external electronic device in the second time period when the second audio data is received.

3. The electronic device of claim 1, wherein:
   the first external electronic device includes an earphone in a first direction, and
   the second external electronic device includes an earphone in a second direction.

4. The electronic device of claim 3, wherein the processor is configured to:
   check a wearing state of each of the first external electronic device and the second external electronic device; and
   display information on the wearing state through the display.

5. The electronic device of claim 1, wherein the processor is configured to:
   receive the first audio data through a first communication link established with the first external electronic device; and
   receive the second audio data through a second communication link established with the second external electronic device.

6. The electronic device of claim 1, wherein the processor is configured to:
   receive the first audio data from the first external electronic device through a first communication link established with the first external electronic device; and
   receive the second audio data from the second external electronic device using the first communication link.

7. The electronic device of claim 1, wherein the processor is configured to:
receive the first audio data and the second audio data from of the first external electronic device and the second external electronic device, respectively, using at least one of an extended synchronous connections (eSCO) communication channel, an asynchronous connectionless (ACL) communication channel, or a BLE communication channel.

8. A method of operating an electronic device, comprising:
establishing at least one communication link with a plurality of external electronic devices;
performing an event for capturing video data using a camera included in the electronic device in a binaural mode;
transmitting a first signal indicating an occurrence of the event to at least one of the plurality of external electronic devices through the at least one communication link;
while capturing the video data using the camera, receiving first audio data corresponding to a first sound acquired by a first external electronic device among the plurality of external electronic devices, in a first time period, and second audio data corresponding to a second sound acquired by a second external electronic device among the plurality of external electronic devices, in a second time period different from the first time period, through the at least one communication link in a state in which the plurality of external electronic devices are worn;
acquiring stereo audio data using the first audio data and the second audio data, based on time and sequence at which the first external electronic device and the second external electronic device acquire the first sound and the second sound, respectively;
identifying a latency between the stereo audio data and the video data based on a first delay time for receiving the first audio data and the second audio data and a second delay time for acquiring the stereo audio data; and
synchronizing and storing the stereo audio data with video data captured using the camera, based on the latency between the stereo audio data and the video data.

9. The method of claim 8, further comprising:
transmitting a first ACK signal to the first external electronic device in the first time period when the first audio data is received; and
transmitting a second ACK signal to the second external electronic device in the second time period when the second audio data is received.

10. The method of claim 8, further comprising:
identifying a wearing state of each of the first external electronic device and the second external electronic device; and
displaying information on the wearing state through the display.

* * * * *